United States Patent [19]
Woodgate et al.

[11] Patent Number: 6,055,013
[45] Date of Patent: Apr. 25, 2000

[54] AUTOSTEREOSCOPIC DISPLAY

[75] Inventors: Graham John Woodgate, Henley-on-Thames; Richard Robert Moseley, Horsham; David Ezra; Nicolas Steven Holliman, both of Wallingford, all of United Kingdom

[73] Assignee: Sharp Kabushiki Kaisha, Osaka, Japan

[21] Appl. No.: 09/018,511

[22] Filed: Feb. 4, 1998

[30] Foreign Application Priority Data

Feb. 4, 1997 [GB] United Kingdom .................... 9702259

[51] Int. Cl.[7] .......................... H04N 13/04; H04N 15/00
[52] U.S. Cl. .................. 348/59; 349/15; 359/463
[58] Field of Search ................................. 348/52, 51, 54, 348/55, 59; 359/462, 463, 464; 349/15; H04N 13/04, 15/00

[56] References Cited

U.S. PATENT DOCUMENTS 5,808,792  9/1998  Woodgate ................................. 348/59

FOREIGN PATENT DOCUMENTS 0726482  8/1996  European Pat. Off. .

OTHER PUBLICATIONS

Search Report for Application No. 98300826.9–2205–; Dated Jun. 2, 1998 (EPO).

*Primary Examiner*—Howard Britton
*Attorney, Agent, or Firm*—Renner, Otto, Boisselle & Sklar

[57] ABSTRACT

An autostereoscopic display comprises an SLM which is controlled to provide an image display and a signal display. A parallax optic has a first portion which cooperates with the image display to form a plurality of viewing windows. A second portion of the parallax optic forms first and second images visible to an observer at alternate viewing windows so as to allow the observer to distinguish between desired orthoscopic viewing zones and undesirable viewing positions such as pseudoscopic positions.

29 Claims, 38 Drawing Sheets

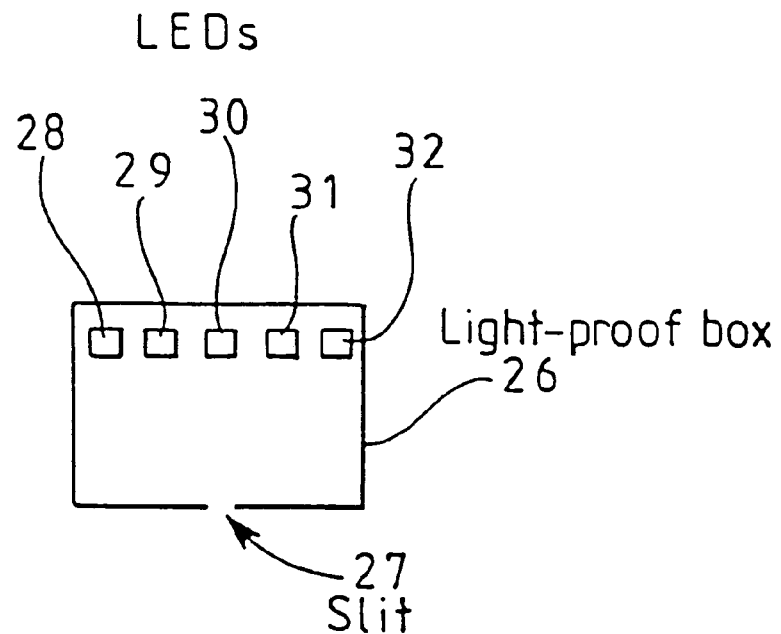
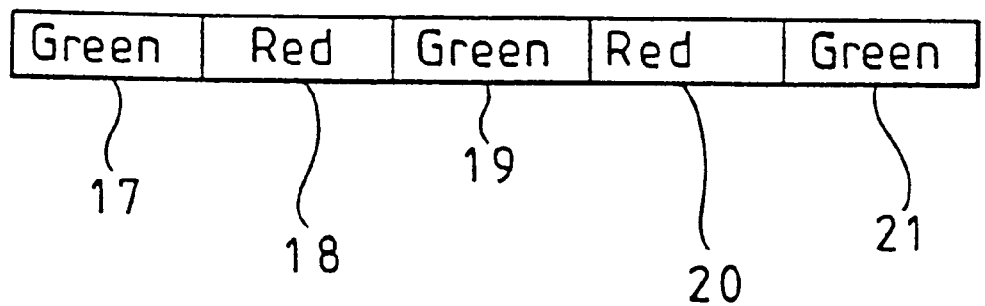
FIG 2
PRIOR ART

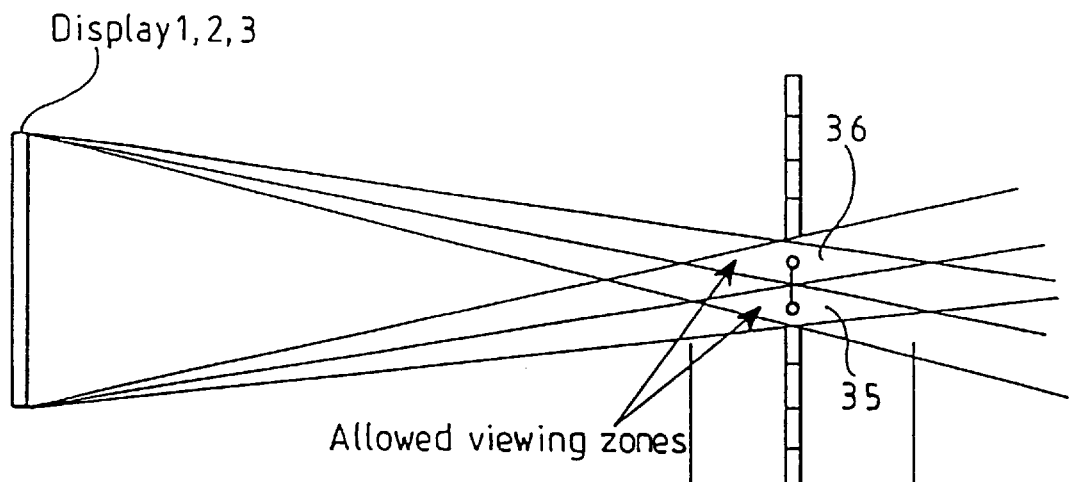
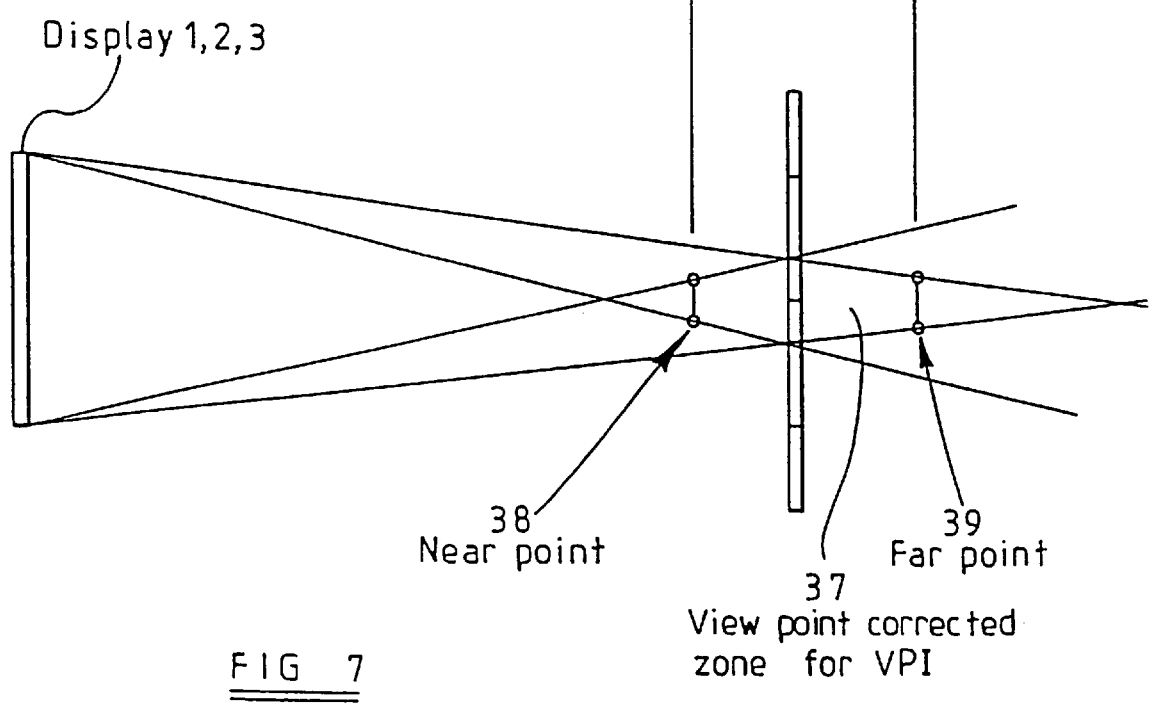
FIG 7

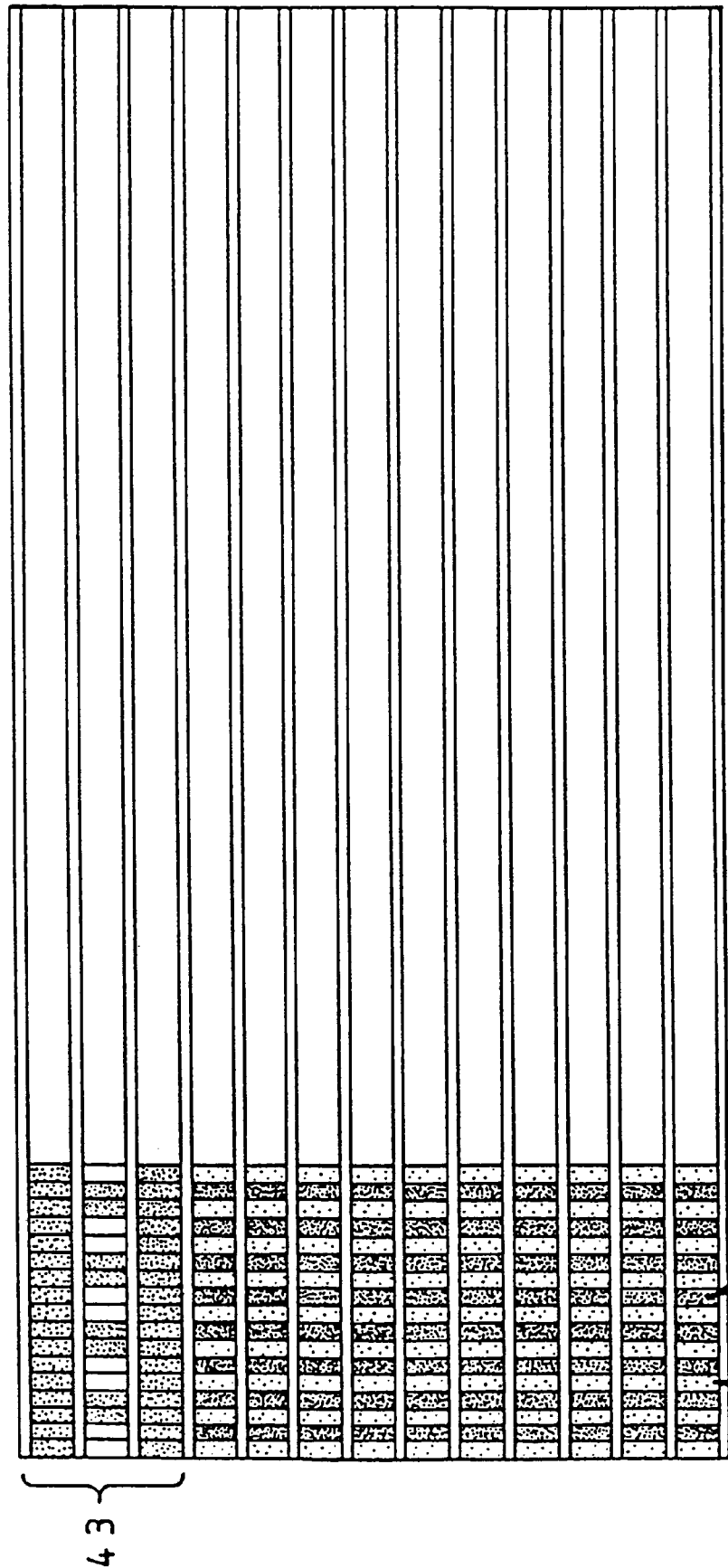

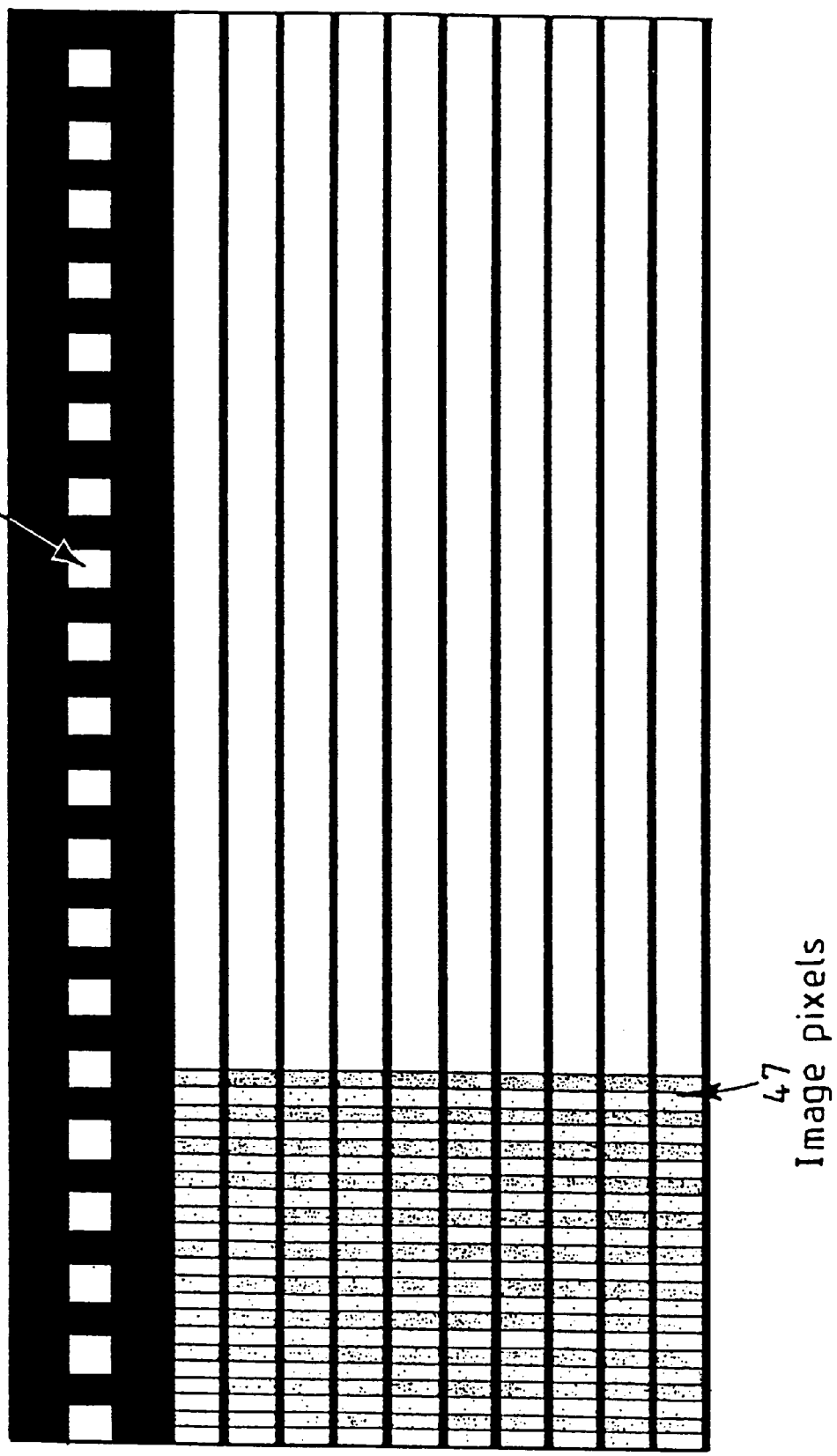

FIG 12
Pixel appearance
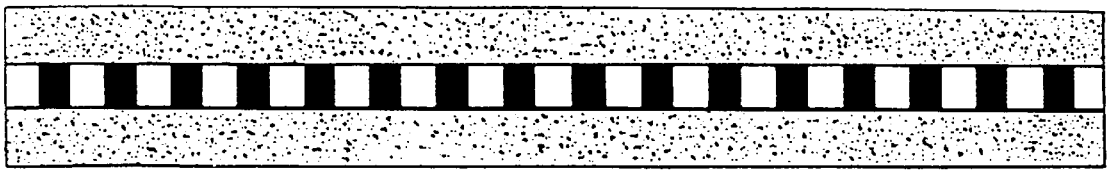
Orthoscopic viewing position
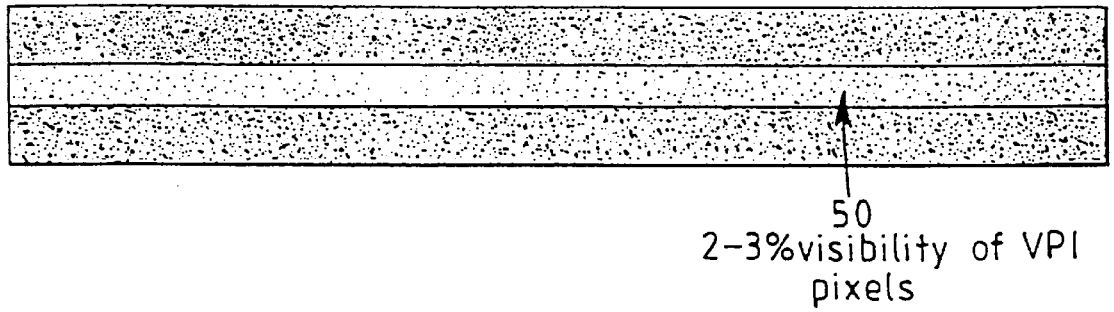
50
2-3% visibility of VPI pixels
Pseudoscopic viewing position

Pixel appearance
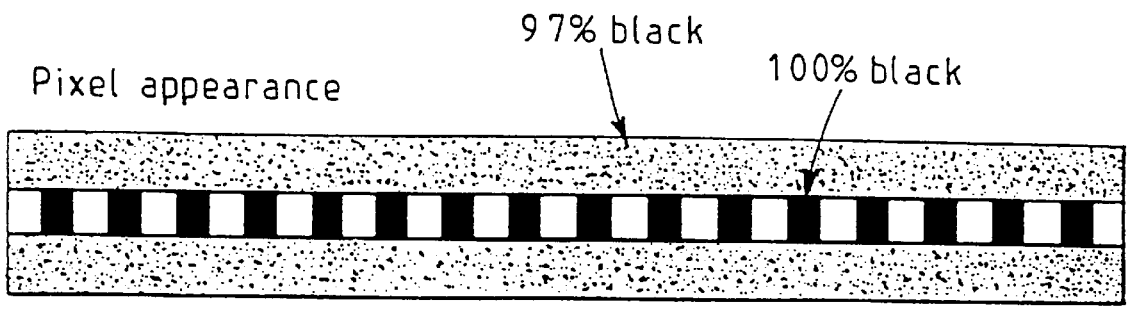
Orthoscopic viewing position
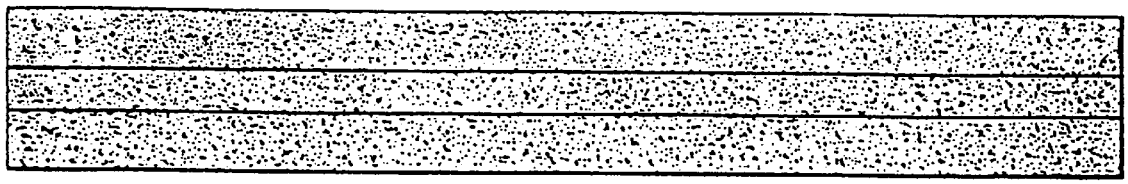
Pseudoscopic viewing position
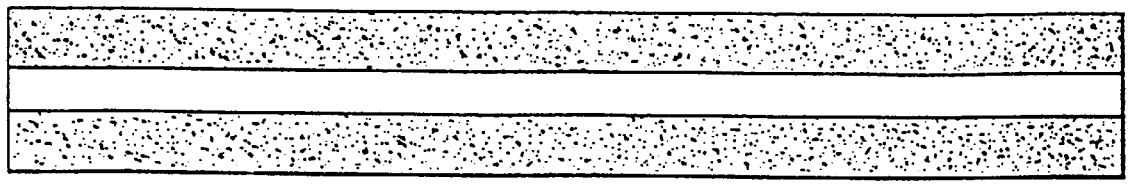
FIG 13

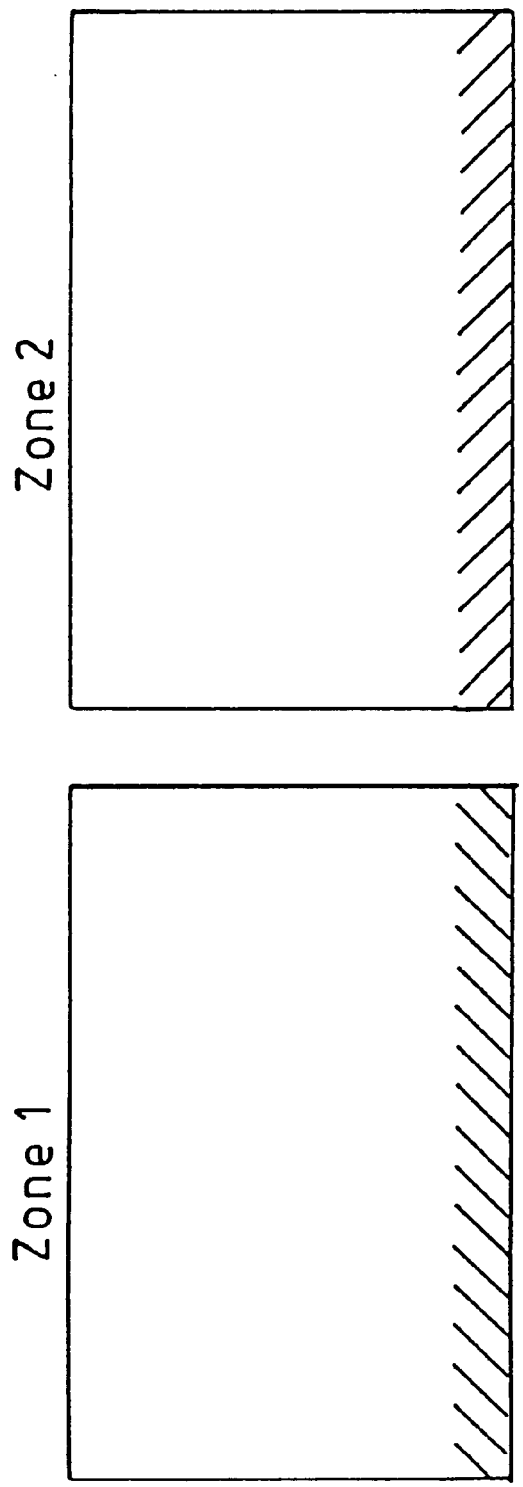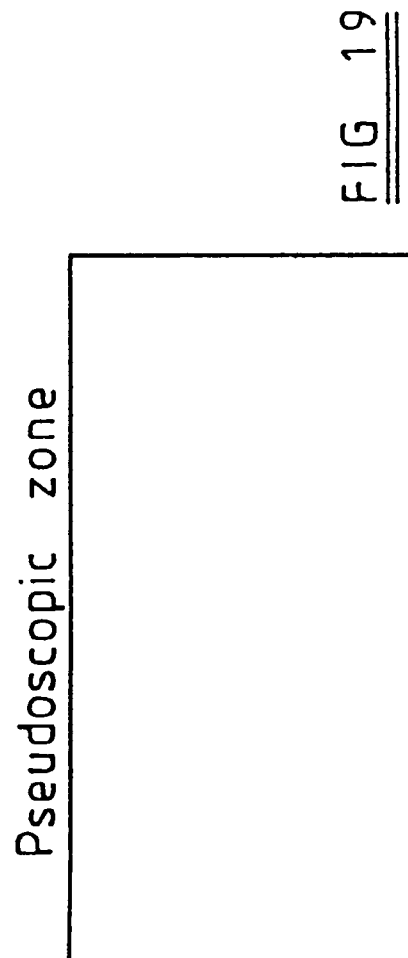
FIG 19

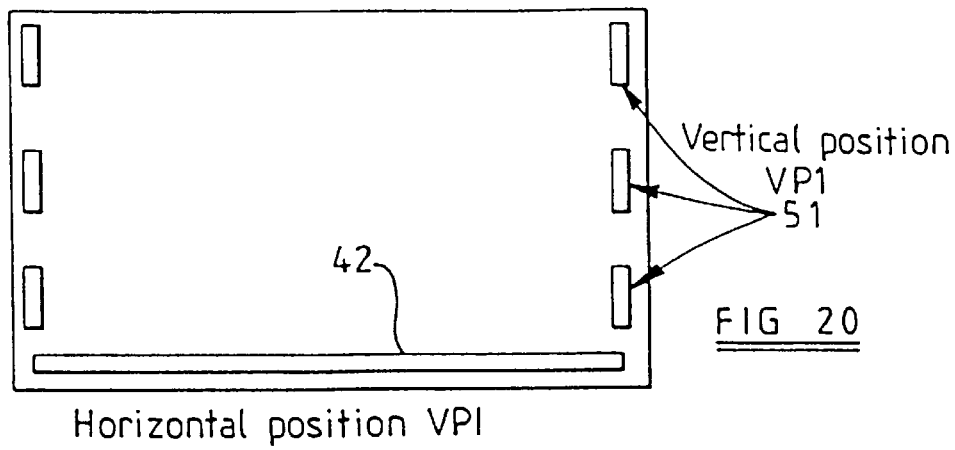
FIG 20
Horizontal position VPI
Horizontal VPI:
VPI parallax barrier
VPI pixels
Orthoscopic viewing position appearance
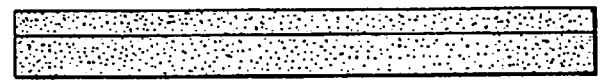
Pseudoscopic viewing position appearance
Vertical position indicator:
VPI parallax barrier
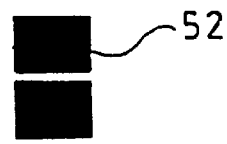
VPI pixels
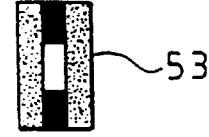
Appearance at correct height
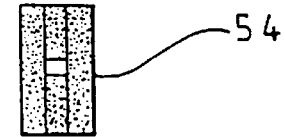
Appearance at wrong height
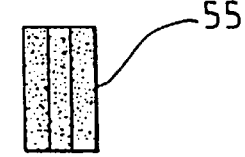

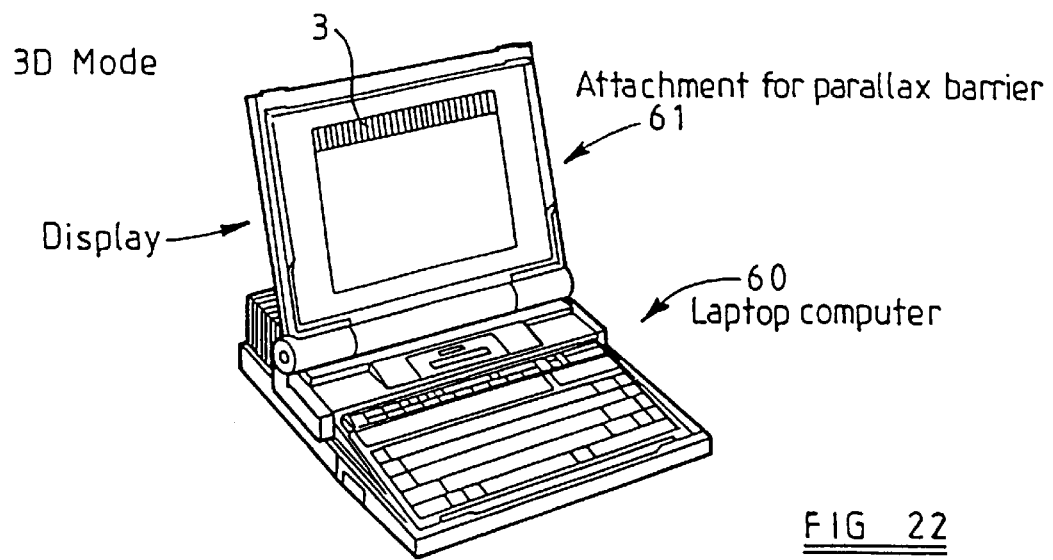
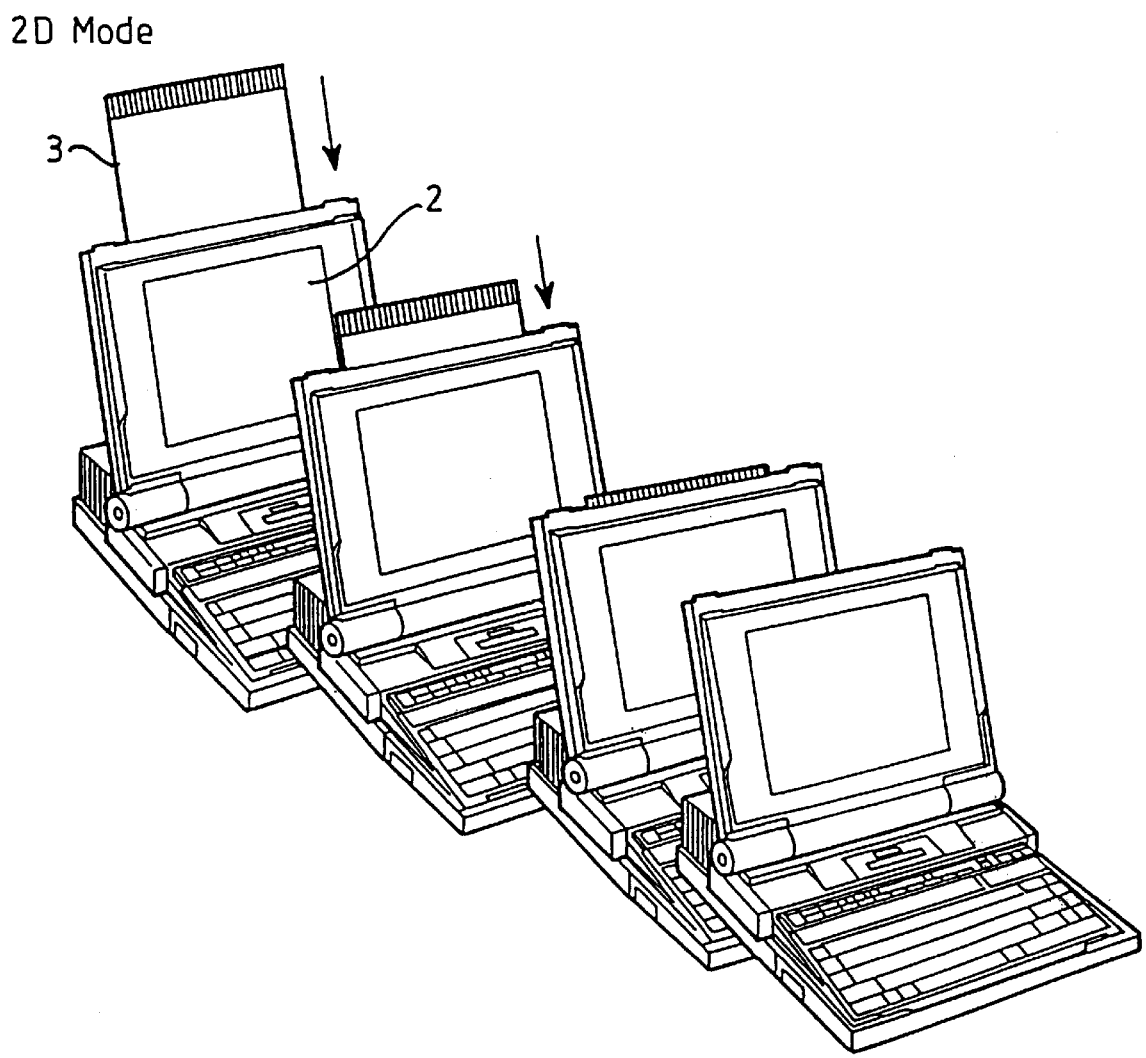
FIG 22

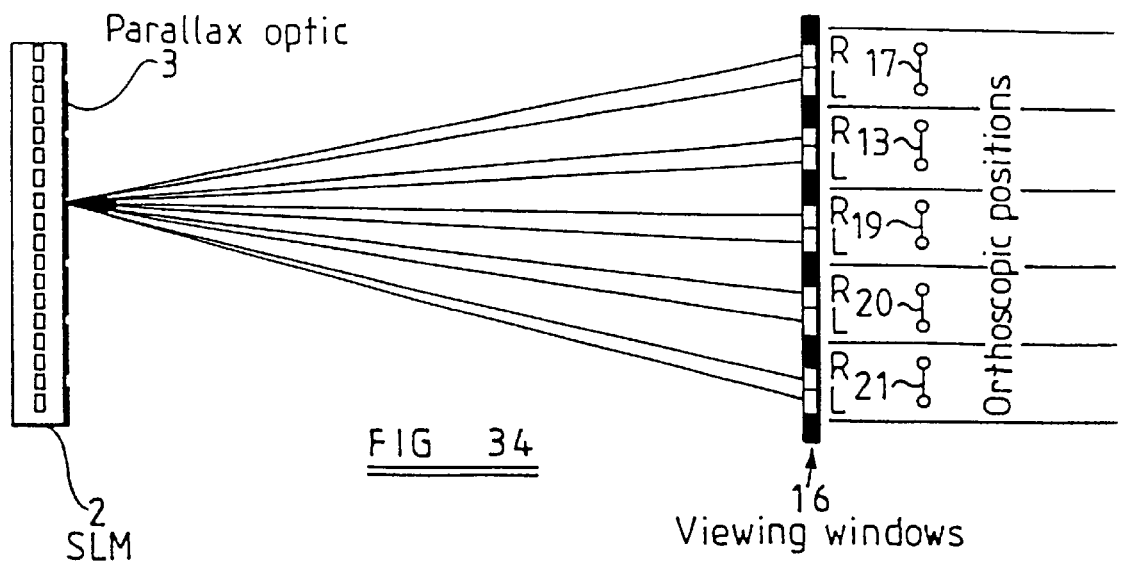
FIG 34
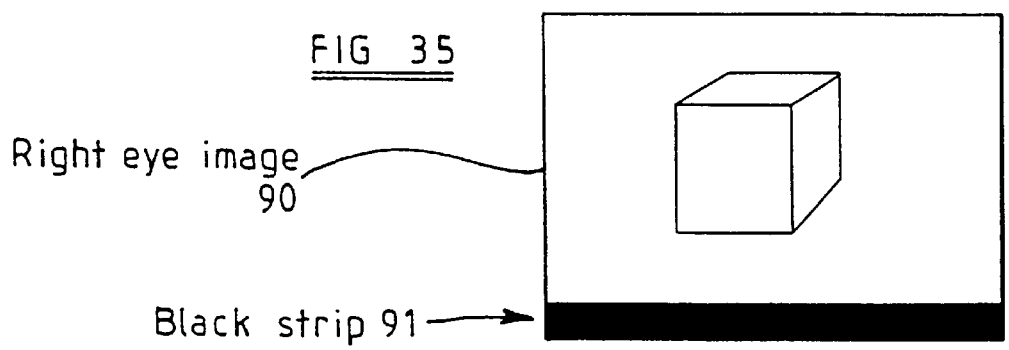
FIG 35
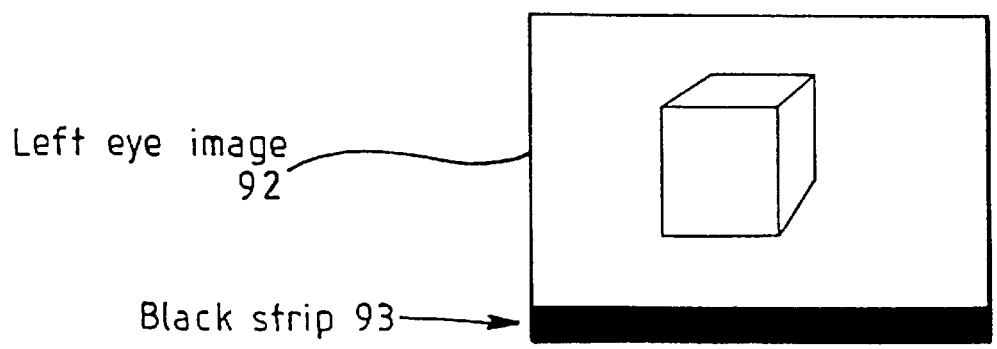
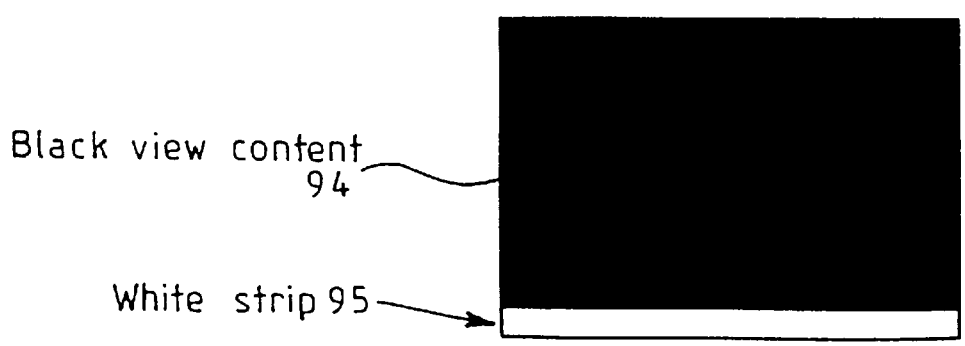

AUTOSTEREOSCOPIC DISPLAY

TECHNICAL FIELD OF THE INVENTION

The present invention relates to an autostereoscopic display. Such a display may comprise an autostereoscopic three dimensional (3D) display and may be used, for instance, in 3D television, medical imaging, computer games, telephony, scientific visualisation, virtual reality and office automation equipment.

DISCUSSION OF THE RELATED ART

A known type of autostereoscopic 3D display is shown in FIG. 1 of the accompanying drawings. The display comprises a diffuse back light 1 disposed behind a spatial light modulator (SLM) 2, for instance in the form of a liquid crystal display (LCD). The SLM 2 comprises an array of picture elements (pixels), for instance as disclosed in European Patent No. 0 625 861 in which the pixels are arranged in columns such that adjacent columns are substantially contiguous with each other in the lateral or horizontal direction.

A parallax optic 3, for instance in the form of a lenticular screen as illustrated diagrammatically in FIG. 1, is disposed in front of the SLM 2. Each parallax element 6 of the parallax optic 3 is aligned with a respective pair of pixel columns of the SLM 2. The pixel columns are controlled so as to display alternating vertical strips of left and right two dimensional (2D) images for the left and right eyes, respectively, of an observer. For instance, the pixel indicated at 4 displays an element of a left eye image whereas the pixel indicated at 5 displays an element of a right eye image.

Light from the columns including the pixels 4 and 5 is imaged by the associated parallax element 6 in a first lobe 7. Light from adjacent pixel columns indicated at 8 and 9 is imaged by the parallax element 6 into adjacent lobes 10 and 11, respectively. Further, light from the next columns indicated at 12 and 13 is imaged by the parallax element 6 into the further lobes 14 and 15.

In order to provide a viewpoint corrected display such that each eye of an observer sees the same image across the whole of the display, the pitch of the parallax elements of the parallax optic 3 is slightly less than twice the pitch of the pixel columns of the SLM 2. This creates viewing zones which are repeated in several lobes. Provided the left and right eyes of an observer are located in the left and right viewing zones, respectively, of one of the lobes, the left eye sees only the 2D image intended for viewing by the left eye and the right eye sees only the 2D image intended for viewing by the right eye across the whole of the display. The widest parts of the viewing zones are referred to as viewing windows and are located in a common plane as indicated at 16. The viewing windows 16 are formed at the intended viewing distance from the display.

Provided the left and right eyes of an observer remain in the left and right eye viewing zones, respectively, the observer views the display orthoscopically and sees the correct 3D image. Such viewing zones may be referred to as orthoscopic viewing zones and viewing window positions for orthoscopic viewing are indicated at 17 to 21. However, if the left and right eyes of the observer are located in right and left viewing zones, respectively, the observer sees a pseudoscopic image. Pseudoscopic viewing window positions are indicated at 22 to 25 in FIG. 1. Pseudoscopic images create problems because they often appear to have some depth despite the depth information being misleading or false. It is not, therefore, always obvious that the observer is in the wrong location. Further, pseudoscopic viewing is known to cause headaches and other symptoms of visual strain.

"Proceedings of Third International Display Workshop", volume 2, Nov. 27–29, 1996 E. Nakayama et al, 1996 International Conference Centre, Kobe, Japan discloses a 3D indicator for assisting an observer to find the proper viewing region of an autostereoscopic 3D display of the type shown in FIG. 1 of the accompanying drawings. The indicator is shown in FIG. 2 of the accompanying drawings and comprises a light-proof box 26 having a front slit 27 and containing light emitting diodes (LED) 28 to 32. The LEDs 28, 30 and 32 emit green light whereas the LEDs 29 and 31 emit red light. The size of the slit 27 and the geometry of the LEDs 28 to 32 with respect to the slit 27 are such that, when the eyes of the observer are located in the orthoscopic positions 17 to 21, light from the LEDs 32 to 28, respectively, can be seen through the slit 27. Thus, when the observer's eyes are in one of the orthoscopic positions 17 to 21, either only a green LED or only a red LED is visible. When the observer moves away from the orthoscopic positions, light from both a green LED and a red LED becomes visible. The observer must therefore position himself so that he can see only light of a single colour through the slit 27 of the indicator.

The indicator is made as a separate device from the autostereoscopic display and therefore requires correct alignment during manufacture in order to ensure that the regions where only a single colour is visible align correctly with the orthoscopic positions within the viewing windows. Such alignment is time-consuming and troublesome and therefore substantially adds to the cost and complexity of manufacture. Further, the optical system of the indicator is different from the optical system of the display itself. Thus, the indicator only provides correct identification of orthoscopic viewing positions at and very close to the plane containing the viewing windows. If the observer moves significantly outside this plane, the indicator no longer provides a correct indication of whether the observer is in an orthoscopic or non-orthoscopic position. Also, because of differences between the optical system of the indicator and the optical system of the display, the indicator provides an indication which is independent of the performance of the display optical system. Thus, even if the indicator is correctly aligned with the display, an observer may receive a false indication of being in an orthoscopic position when, in fact, imperfections in the display optical system are such that the observer is in an inappropriate viewing position.

GB2252175 discloses an autostereoscopic display of the parallax barrier type. When a viewer moves out of the orthoscopic viewing region, the image which is visible to the viewer changes. Lateral movement causes the perceived image to darken whereas longitudinal movement results in vertical stripes being superimposed on the image. These image changes result from the parallax barrier structure of the display.

WO94/24601 also discloses an autostereoscopic display in which the perceived image changes when the viewer moves outside the orthoscopic viewing region. In this case, the perceived image becomes monoscopic immediately the viewer leaves the orthoscopic viewing zone so as to avoid pseudoscopic viewing.

SUMMARY OF THE INVENTION

According to the present invention, there is provided an autostereoscopic display comprising an image display, a signal display, and a parallax optic characterised in that the parallax optic has a first portion, which cooperates with the image display to form a plurality of right and left eye viewing zones in a viewing region, and a second portion, which cooperates with the signal display to form a first signal image which is visible in at least one first part of the viewing region and a second signal image which is visible in at least one second part of the viewing region.

It is thus possible to provide an arrangement which allows an observer to determine his position with respect to an autostereoscopic display irrespective of the actual images being displayed. In particular, by viewing the first and second signal images, the observer can determine whether he is in a first or second part of the viewing region.

Each of the first and second parts may comprise a respective adjacent pair of viewing zones. The at least one first part may comprise a plurality of first parts and the at least one second part may comprise a plurality of second parts which alternate spatially with the first parts. The first parts may comprise alternate orthoscopic viewing zones. It is thus possible for the observer to determine whether he is located in an orthoscopic viewing region or in a pseudoscopic viewing region.

The first and second signal images may differ in various ways. For instance, one of the first and second signal images may be a bright image and the other of the first and second images may be a dark image. In another example, the first signal image may be a first colour and the second signal image may be a second colour different from the first colour.

By using a parallax optic having the first and second portion, alignment is automatically provided during manufacture of the parallax optic. Further, the image display and the signal display may comprise first and second portions, respectively, of a common display. Alignment of the first and second portions may therefore be achieved during manufacture so that no adjustments to achieve alignment are necessary during assembly of the autostereoscopic display.

The common display may be embodied in various ways. For instance, the common display may comprise a light-transmissive spatial light modulator, such as a liquid crystal device, and a light source. As an alternative, the common display may comprise a light emitting display.

The image display and the first portion may cooperate to form viewing zones in a plurality of lobes with two viewing zones per lobe. By minimising the number of viewing zones per lobe, improved 3D image resolution and possibly increased brightness may be achieved.

The first portion may comprise an array of parallax elements having a first pitch in a first direction, the second portion may comprise an array of parallax elements having a second pitch substantially equal to twice the first pitch in the first direction, and each parallax element of the second portion may be aligned in a second direction substantially perpendicular to the first direction with a respective parallax element of the first portion. The image display may comprise an array of picture elements having a third pitch in the first direction substantially equal to or greater than half the first pitch and less than the first pitch and the signal display may comprise an array of picture elements which have a fourth pitch substantially equal to twice the third pitch in the first direction and which are substantially coplanar with the picture elements of the image display. Such an arrangement is simple and convenient to manufacture and is therefore relatively inexpensive.

The parallax optic may be embodied in various ways. For instance, the parallax optic may comprise a lens array, such as a lenticular screen. As an alternative, the parallax optic may comprise an array of holographic optical elements. As a further alternative, the parallax optic may comprise a parallax barrier. The first portion of the parallax barrier may comprise a plurality of slits of a first width and the second portion of the parallax barrier may comprise a plurality of slits of the first width. As an alternative, the first portion of the parallax barrier may comprise a plurality of slits of a first width and the second portion of the parallax barrier may comprise a plurality of slits of a second width less than the first width.

Each parallax element of the second portion may be aligned in a second direction substantially perpendicular to the first direction with a respective parallax element of the first portion.

The parallax optic may be removable for a non-autostereoscopic display mode. Such an arrangement may be used to provide a full resolution 2D viewing mode. Alternatively, the parallax optic may be electronically switchable to a 2D mode, for instance as disclosed in GB 9620210.6. Such an electronically switchable parallax barrier may be arranged to switch viewer position indication on or off so that more of the display may be used for displaying a 3D image when viewer position indication is not required.

Where the parallax optic is embodied as a parallax barrier, the parallax barrier may comprise a first layer and a removable second layer, the first layer comprising barrier regions for passing light having a first polarisation and aperture regions for supplying at least light having a second polarisation which is substantially orthogonal to the first polarisation, the second layer comprising a polariser for passing light of the second polarisation. The second layer acts as an output polariser which absorbs light of the first polarisation and transmits light of the second polarisation when the display is in its 3D mode. The first layer may be fixed in correct registration with respect to the remainder of the autostereoscopic display. Switching between autostereoscopic and non-autostereoscopic modes can be achieved by removing and replacing the second layer, which requires only angular registration with respect to the rest of the display, thus reducing the tolerancing requirements so that difficulties with aligning a movable element can be reduced or avoided.

The image display and the signal display may be arranged to supply light of the first polarisation, the barrier regions may be arranged to pass light of the first polarisation, and the aperture regions may be arranged to convert light of the first polarisation at least partially to light of the second polarisation. The first layer may be a half waveplate, the barrier regions may have optic axes parallel to the first polarisation and the aperture regions may have optic axes aligned at 45° to the first polarisation. By avoiding the use of devices such as polarisation rotators in the barrier regions, suppression of light from the barrier regions can be maximised across the visible spectrum. This allows cross-talk between views to be minimised.

The signal display may be arranged to be active throughout a lateral extent corresponding to the lateral extent of the or each three dimensional image displayed by the image display. Such an arrangement allows the longitudial viewing freedom of the display to be optimally indicated.

The invention will be further described, by way of example, with reference to the accompanying drawings, in which:

BRIEF DESCRIPTION OF THE INVENTION

FIG. 2 is a diagrammatic cross-sectional view on a horizontal sectional plane of a known observer position indicator;

FIG. 7 is a plan view illustrating viewing zone formation by the display of FIGS. 3 and 4;

FIG. 11a illustrates information displayed by an SLM of the display shown in FIGS. 3 and 4;

FIG. 11b illustrates the pixel appearance of the SLM shown in FIGS. 3 and 4;

FIG. 12 illustrates the position indication appearance for the display of FIGS. 3 and 4;

FIG. 13 is similar to FIG. 12 but illustrates a modification;

FIG. 19 illustrates the use of cross-hatched images;

FIG. 20 illustrates the use of vertical and horizontal position indication;

FIG. 22 illustrates a laptop computer including a display of the type shown in FIGS. 3 and 4 with a removable parallax barrier;

FIG. 34 is a diagrammatic cross-sectional view of a display constituting a further embodiment of the invention;

FIG. 35 shows an example of images displayed by the display of FIG. 34;

DETAILED DESCRIPTION OF THE INVENTION

Figure 1:
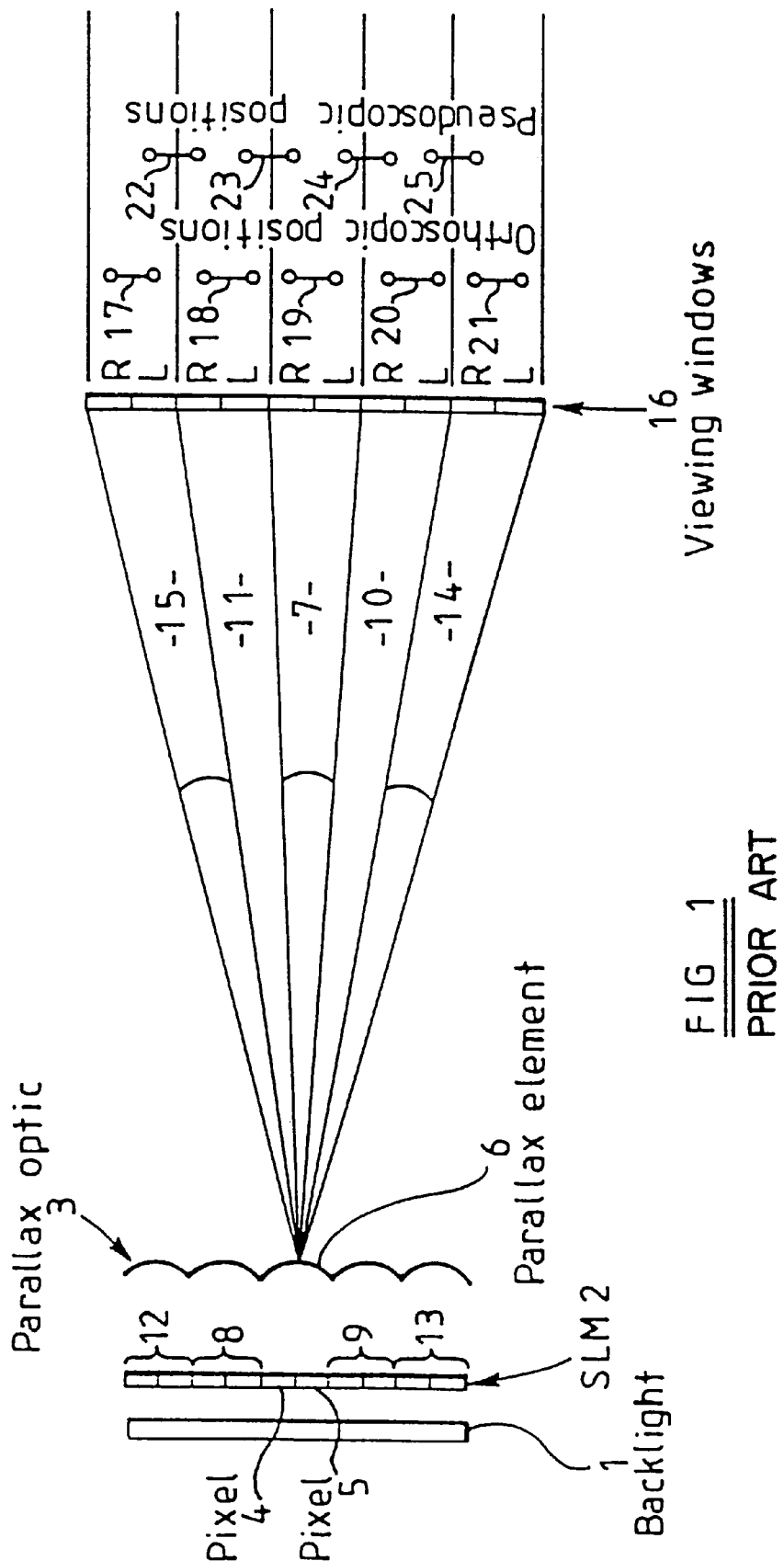
FIG. 1 is a diagrammatic cross-sectional view on a horizontal sectional plane of a known autostereoscopic 3D display.

Like reference numerals refer to like parts throughout the drawings.

Figure 3:
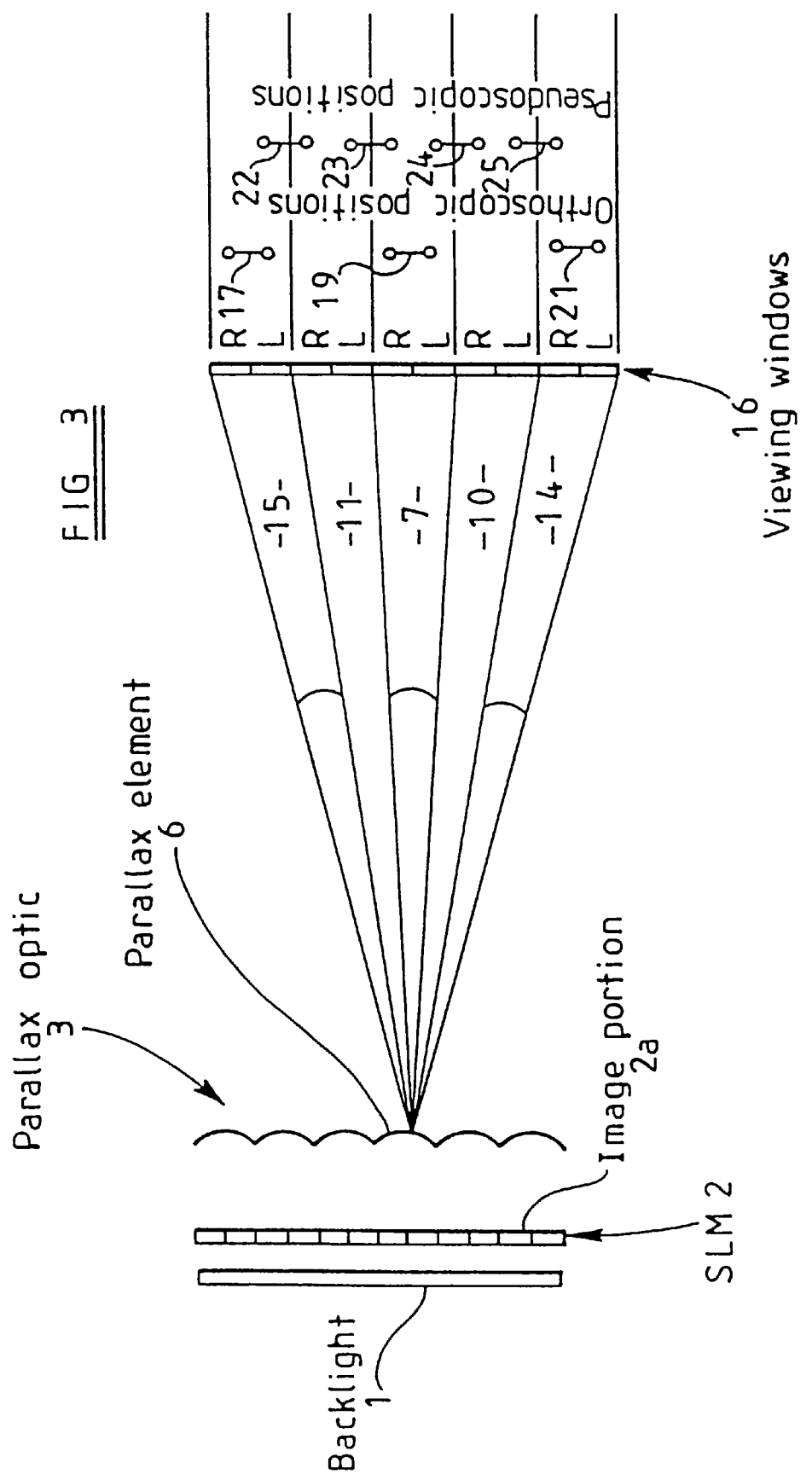
FIGS. 3 and 4 are diagrammatic cross-sectional views on horizontal sectional planes at different heights of an autostereoscopic 3D display constituting an embodiment of the invention.
Figure 4:
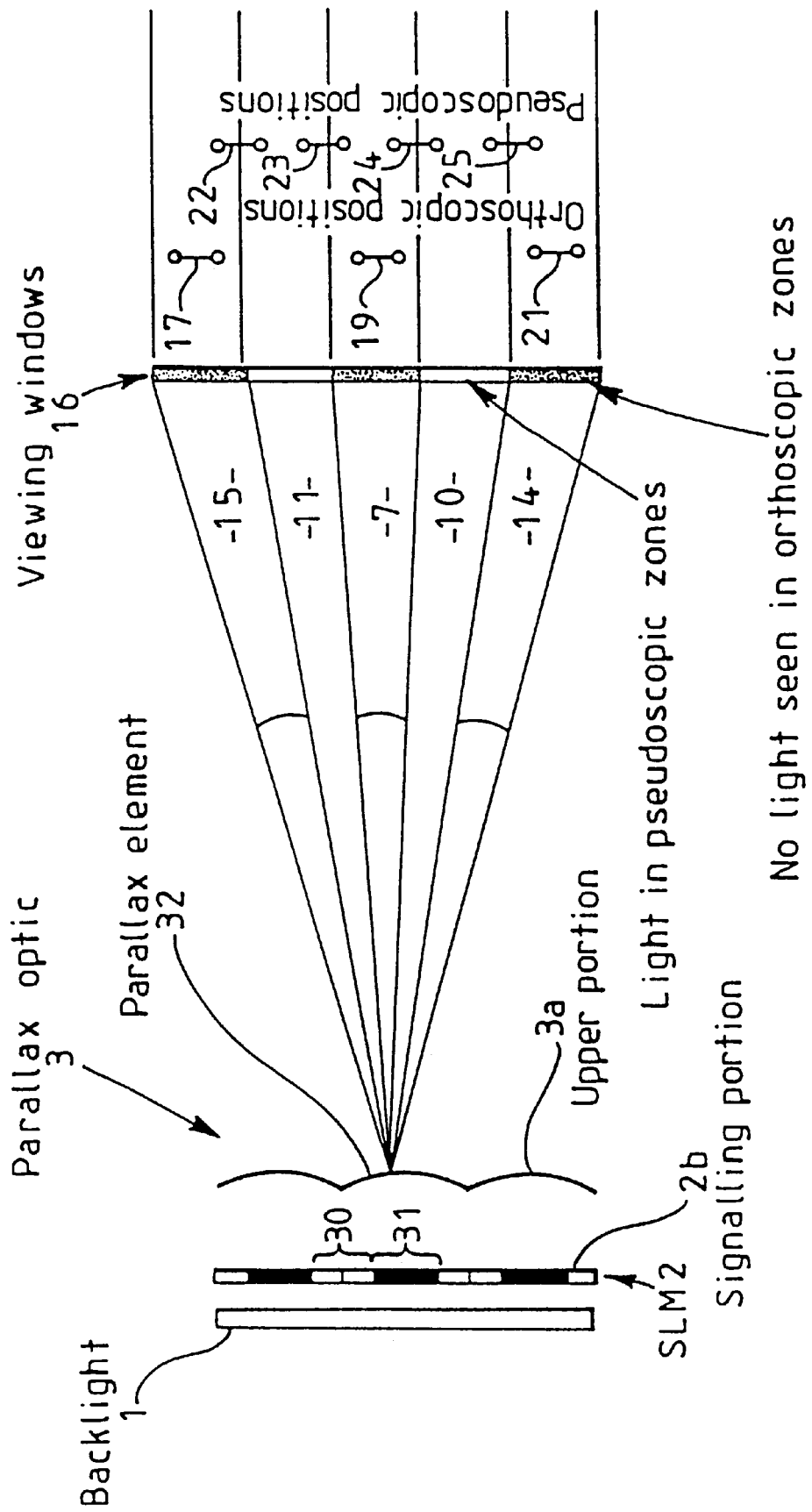

The autostereoscopic 3D display shown in FIGS. 3 and 4 differs from that shown in FIG. 1 in that it includes a viewer position indicator (VPI) arrangement shown in FIG. 4. This arrangement comprises part of the backlight 1, part of the SLM 2 and part of the parallax optic 3. As shown in FIG. 3, the SLM 2 has an image portion for displaying two 2D stereoscopic images as interlaced vertical strips on alternating columns of pixels with each parallax element 6 being optically aligned with an adjacent pair of pixel columns. Left and right viewing zones are formed in the lobes 7, 10, 11, 14 and 15 but only the orthoscopic viewing positions 17, 19 and 21 are intended for use by an observer. Thus, the orthoscopic positions 18 and 20 shown in FIG. 1 are not intended for use.

The viewer position indicator arrangement is formed by an upper strip of the backlight 1, a signalling portion 2B comprising one or more upper rows of pixels of the SLM 2, and a portion 3a of the parallax optic 3. The pixels shown in FIG. 4 are operated in horizontal pairs so as to act as pixels such as 30 and 31 having twice the horizontal extent and twice the pitch of the pixels shown in FIG. 3 and used for displaying the stereoscopic images. The portion 3a of the parallax optic 3 comprises a portion whose parallax elements 32 have twice the horizontal pitch of the parallax elements 6 shown in FIG. 3. Pixels such as 30 (shown unshaded) are controlled so as to provide a bright image and alternate laterally with pixels such as 31 (shown shaded) which are controlled so as to provide a dark image. In particular, the pixels 30 are substantially transparent whereas the pixels 31 are substantially opaque.

Each parallax element 32 is aligned with a respective parallax element 6. The pixels 30 and 31 and the parallax elements 32 cooperate to provide a bright image in the lobes 10 and 11 and a dark image in the lobes 7, 14 and 15. Thus, when an observer is located at the orthoscopic positions 17, 19 and 21 in the viewing windows 16, the viewer position indicating arrangement appears dark. As the observer moves from an orthoscopic position such as 19 to a pseudoscopic position such as 23, light from the viewer position indicating arrangement becomes visible, for instance to the right eye of the observer, thus indicating to the observer that he has moved from an orthoscopic position to a pseudoscopic position. If just one eye sees light from the viewer position indicating arrangement, the brain registers this as image data. The display does not, therefore, require both eyes of the observer to see light from the arrangement in order to work. Thus, provided the observer moves to a position where no light is visible from the viewer position indicating arrangement, he will remain in an orthoscopic position such as those indicated at 17, 19 and 21.

Figure 5:
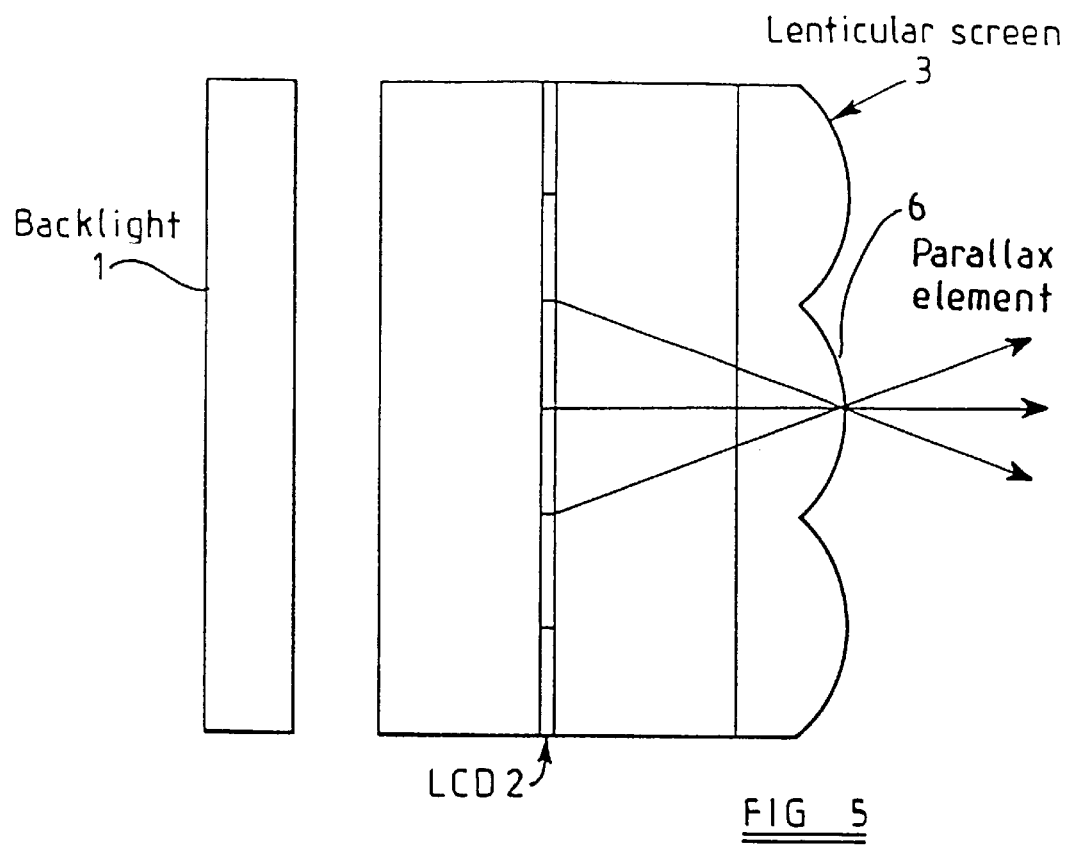
FIG. 5 is a diagrammatic cross-sectional view illustrating a lenticular screen display of the type shown in FIGS. 3 and 4.
Figure 6A:
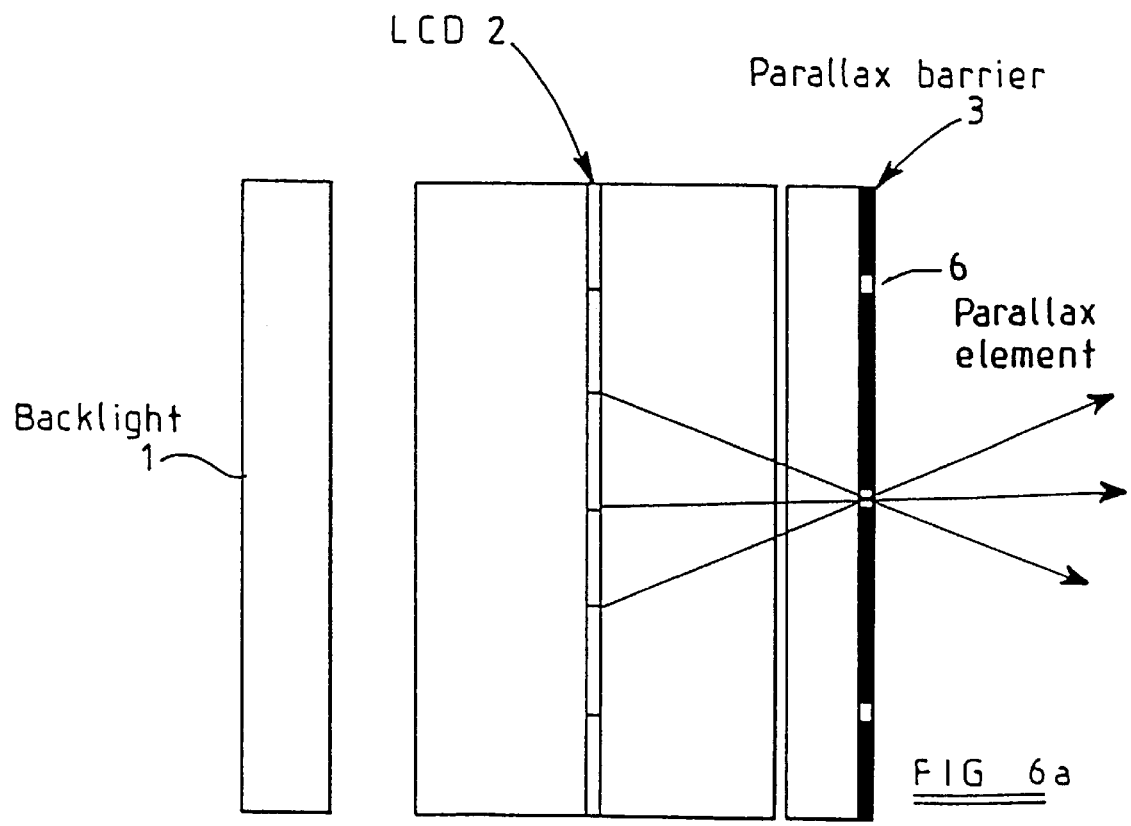
FIG. 6a is a diagrammatic cross-sectional view illustrating a front parallax barrier display of the type shown in FIGS. 3 and 4.
Figure 6B:
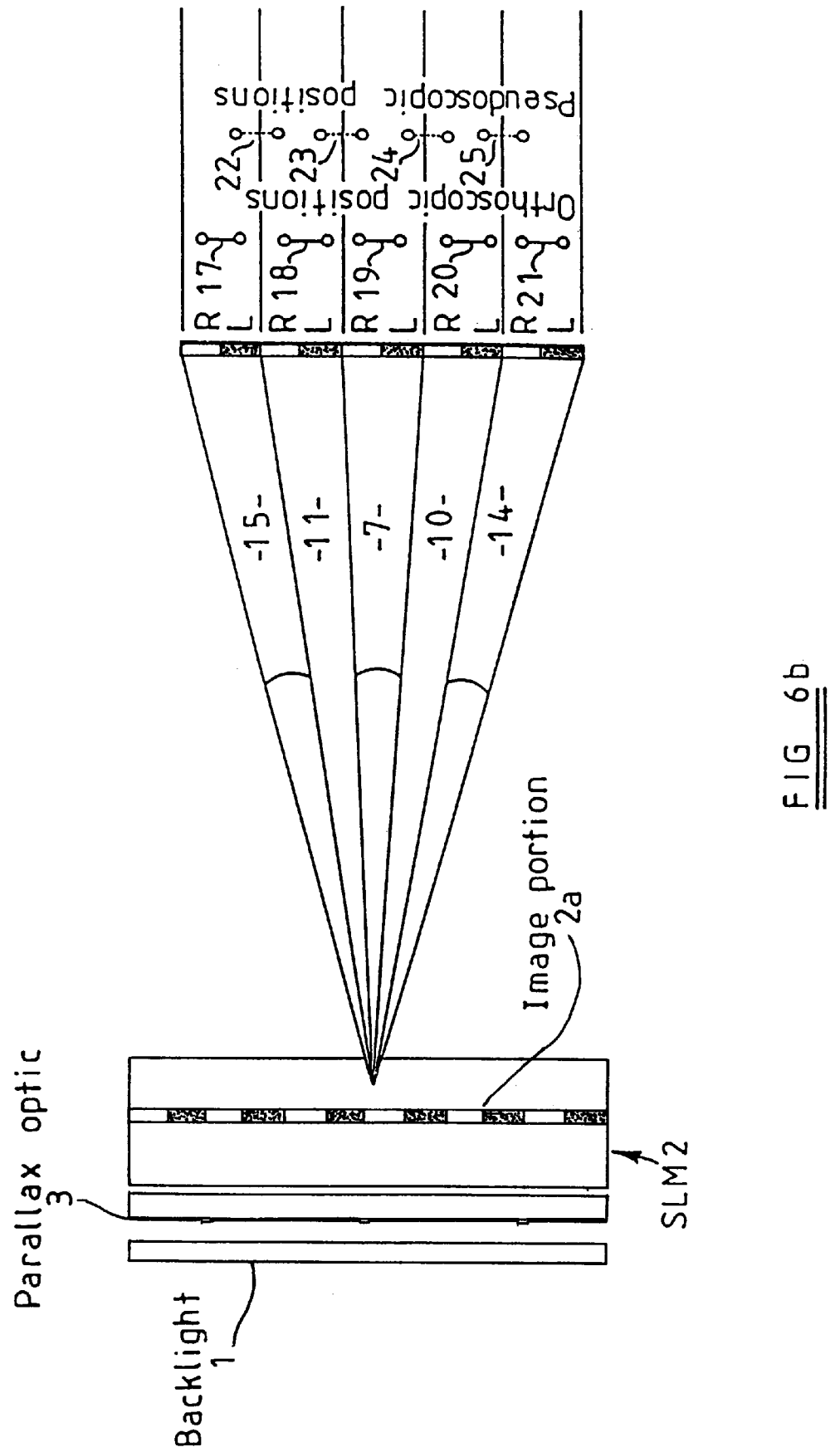
FIGS. 6b and 6c are views similar to FIGS. 3 and 4, respectively, of a rear parallax barrier display constituting an embodiment of the invention.
Figure 6C:
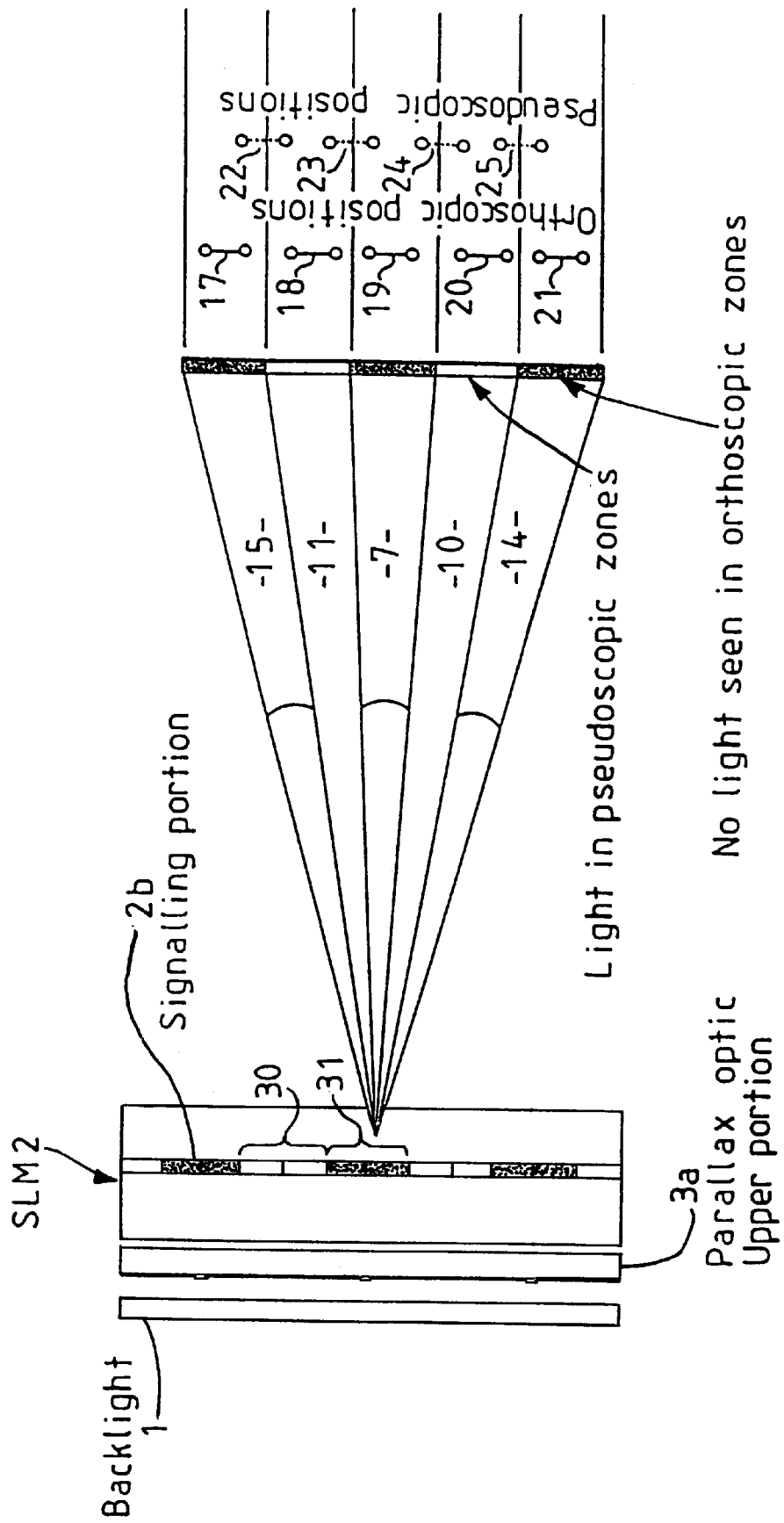

FIG. 5 illustrates a specific arrangement of the display in which the SLM comprises an LCD 2 and the parallax optic comprises a lenticular screen 3, The arrangement of FIG. 6a differs from that of FIG. 5 in that the lenticular screen 3 is replaced by a parallax barrier constituting the parallax optic. The parallax barrier 3 is illustrated at the output side of the LCD 2 but may alternatively be located between the LCD 2 and the backlight 1 as shown in FIGS. 6b and 6c. In this case, the pitch of the parallax barrier 3 is slightly larger than the pitch of the pixel columns so as to provide viewpoint correction.

Other forms of parallax optic 3 are possible, such as holographic optical elements as described hereinafter.

FIG. 7 illustrates the permissible range of movement of an observer. As described hereinbefore, the display comprising the elements 1, 2 and 3 is of the viewpoint corrected type in which left and right viewing zones 35 and 36 are formed. The display is arranged to form the viewing zones such that the widest lateral extents forming the viewing windows have a pitch substantially equal to the average interocular separation of an observer. Provided the left and right eyes of the observer remain within the viewing zones 35 and 36, respectively, in each lobe, the observer will see the desired 3D image. Lateral or longitudinal observer movement such that at least one eye moves out of its viewing zone will allow the observer to see an undesired image. For instance, as described hereinbefore, lateral movement of the observer in the plane containing the viewing windows leads to pseudoscopic viewing in which the left and right images are seen by the right and left eyes, respectively, of the observer.

The lower part of FIG. 7 illustrates the formation of a viewpoint corrected zone 37 for the viewer position indicating arrangement. Both eyes of an observer must be within the zone 37 in order to see an orthoscopic image. The arrangement of the pixels of the SLM 2 and of the elements 6 and 32 of the parallax optic 3 is such that the zones 37 are produced in lobes which are laterally and longitudinally aligned with adjacent pairs of orthoscopic viewing zones 35 and 36. Bright and dark zones 37 alternate laterally and are aligned with alternate orthoscopic viewing zones for the observer. Provided the observer remains within a dark zone 37 such that no light from the viewer position indicating arrangement is visible to either eye, the observer will be in one of the orthoscopic viewing zones intended for use. If the observer moves outside the dark zones 37 as a result of lateral or longitudinal movement or both relative to the display 1, 2 and 3, light will be visible to either or both eyes of the observer.

For instance, the near point 38 and the far point 39 are shown in FIG. 7 and represent the closest and furthest orthoscopic viewing positions of the observer. Movement nearer to or further from the display will result in the observer moving outside the zone 37 and seeing, light from the viewer position indicating arrangement. As shown in the upper part of FIG. 7, such movement would take the observer outside the intended orthoscopic viewing zone. Accordingly, the viewer position indicating arrangement provides an unambiguous indication to the observer of any movement outside the intended orthoscopic viewing zones. As the observer moves further away from the intended orthoscopic viewing zones, more light is seen over the area of the viewer position indicating arrangement. This therefore assists the observer to position himself correctly for orthoscopic viewing of the 3D image.

By using different parts of the SLM 2 and the parallax optic 3 to provide the viewer position indicating arrangement, such an arrangement may be provided without increasing the bulk of the autostereoscopic display and with little or no additional cost. No alignment step during manufacture is required for the viewer position indicating arrangement to be aligned with the rest of the display because alignment is guaranteed subject to tolerances in the SLM 2 and the parallax optic 3 individually. Similarly, misalignment cannot occur during use of the autostereoscopic display. Further, substantially the same viewing performances of the display part and the viewer position indicating arrangement part are provided. Thus, aberrations, defocus, scatter and other effects which degrade viewing window quality similarly affect the performance of the viewer position indicating arrangement. The position indication is provided within the area of the display and so is readily visible to an observer.

The viewer position indicating arrangement does not require additional power or connections. Further, it can readily be incorporated in small hand held devices or in laptop type displays.

Figure 8:
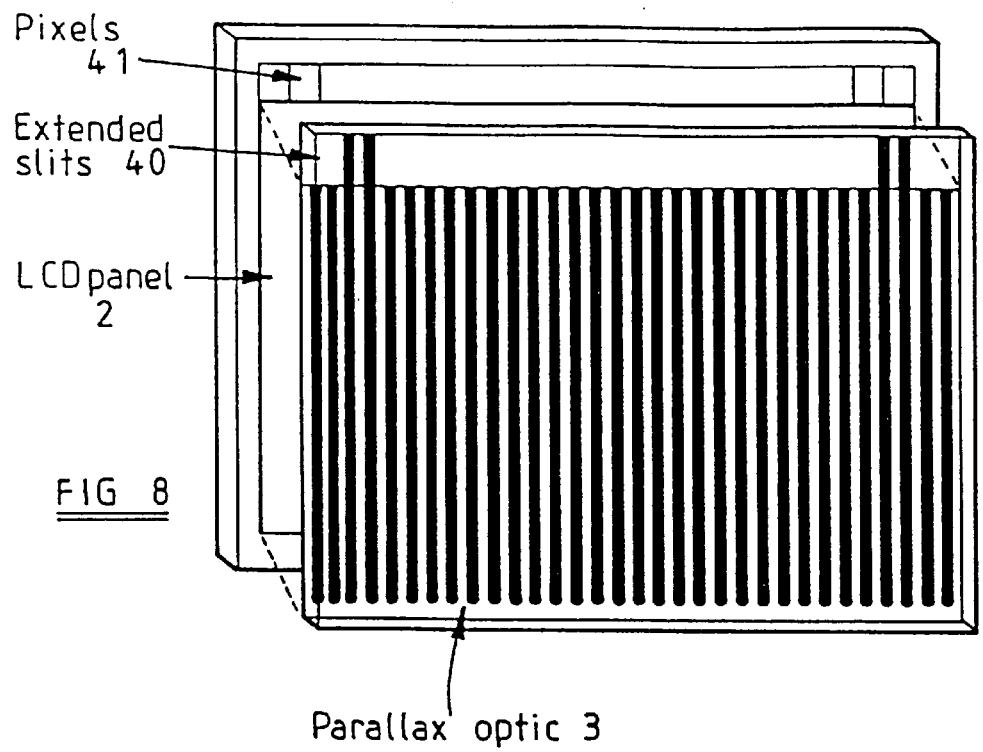
FIG. 8 illustrates a possible form of the display of FIGS. 3 and 4.

FIG. 8 illustrates a possible arrangement of the display. The parallax optic 3 is shown forward of its normal position against the SLM 2 which comprises an LCD panel. The parallax optic 3 is illustrated as a parallax barrier in which at least some of the slits are extended as shown at 40 and cooperate with pixels 41 at the top of the panel 2 to provide the viewer position indicating arrangement. Thus, no additional components are required to provide the viewer position indication and it is merely necessary for the pixels 41 to be controlled appropriately.

It is possible for only one slit to be extended over a few pixels to provide a point or spot-shaped indication of viewer position. The arrangement shown in FIG. 7 would provide two such points visible on the indicator. However, it is preferable for the slits to be extended across the whole width of the display so as to provide a line-shaped indication as described hereinafter.

Figure 9A:
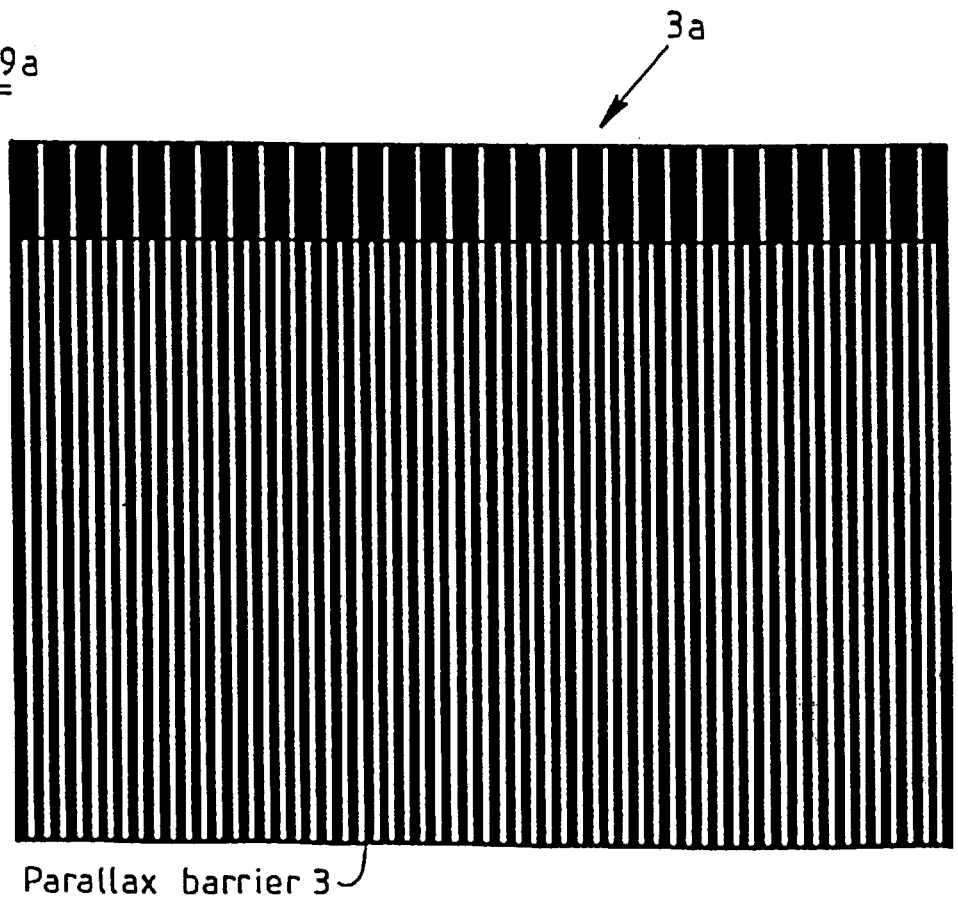
FIGS. 9a and 9b illustrate two types of parallax optic of the display of FIGS. 3 and 4.

FIG. 9a shows the parallax barrier 3 of FIG. 8 in more detail with slits across the whole width extended to provide line-shaped indication. The portion of the parallax barrier 3 which cooperates with the LCD panel 2 to form the autostereoscopic image comprises a plurality of parallel vertically extending slits disposed at a regular horizontal pitch. The slits are defined by opaque regions of the barrier 3. The portion 3a of the barrier 3 also comprises an array of slits but disposed at twice the horizontal pitch of the slits of the lower part and with each slit of the upper part being vertically aligned with a respective slit of the lower part. The slits all have the same optical width. Thus, the boundaries of the windows have the same optical performance. As a result, as the observer starts to approach a window boundary, image cross-talk increases. However, the same amount of crosstalk occurs in the viewer position indicating arrangement so that this arrangement gives direct information on the performance of the autostereoscopic display in a form which is readily visible to the observer.

Figure 9B:
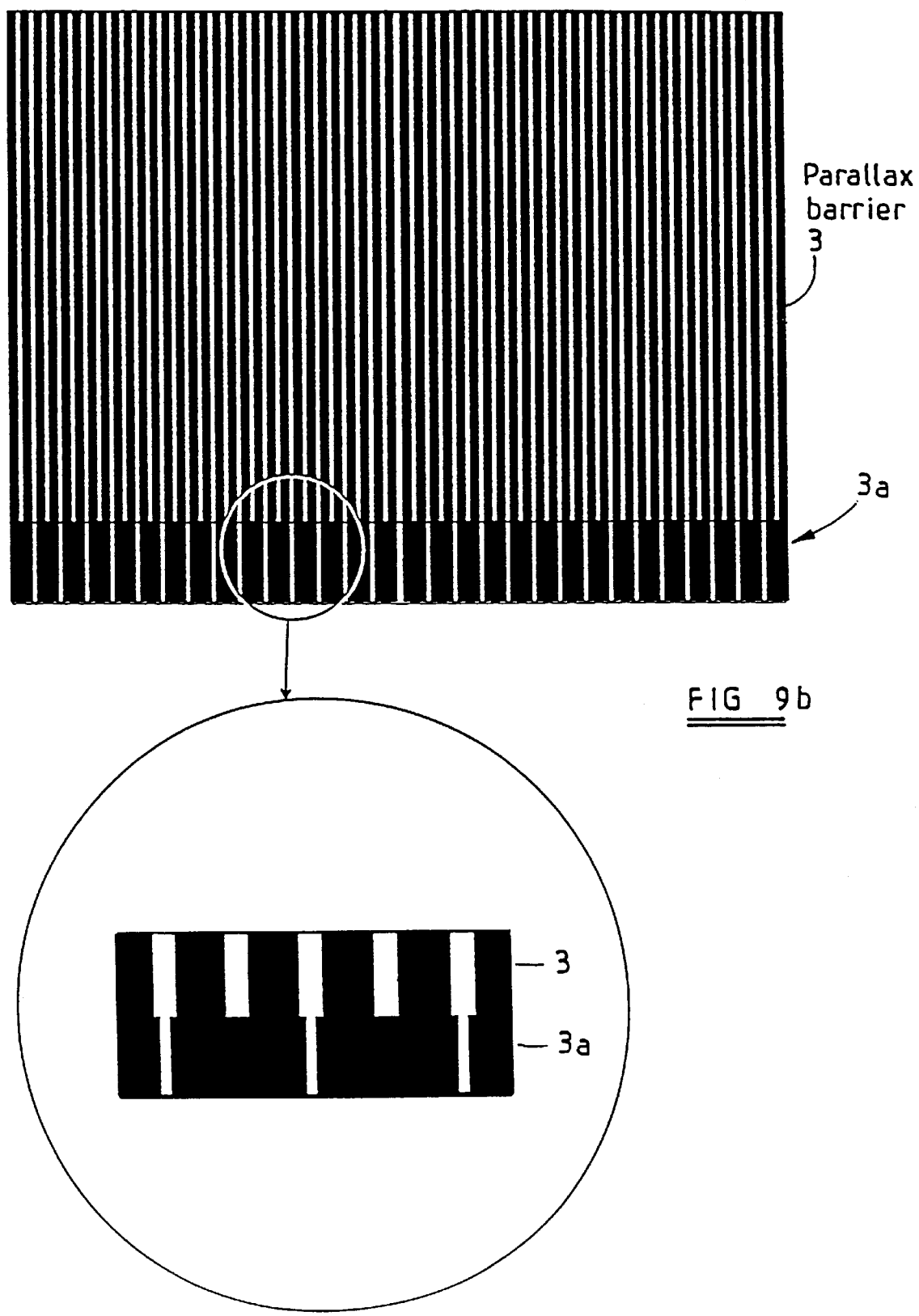

Alternatively, the slit width of the portion 3a may be changed to tighten the best viewing position. FIG. 9b shows a parallax barrier 3 in which the slit width in the portion 3a is narrower than the slit width in the remainder of the barrier so as to give a more defined "best" viewing location. Also, parts of a black mask of the SLM 2 between the pixels aligned with the upper and lower parts of the barrier 3 cause black zones in the window plane, which black zones are undesirable viewing regions. The viewer position indicating arrangement also gives information on the black mask shape as described hereinafter.

Figure 10:
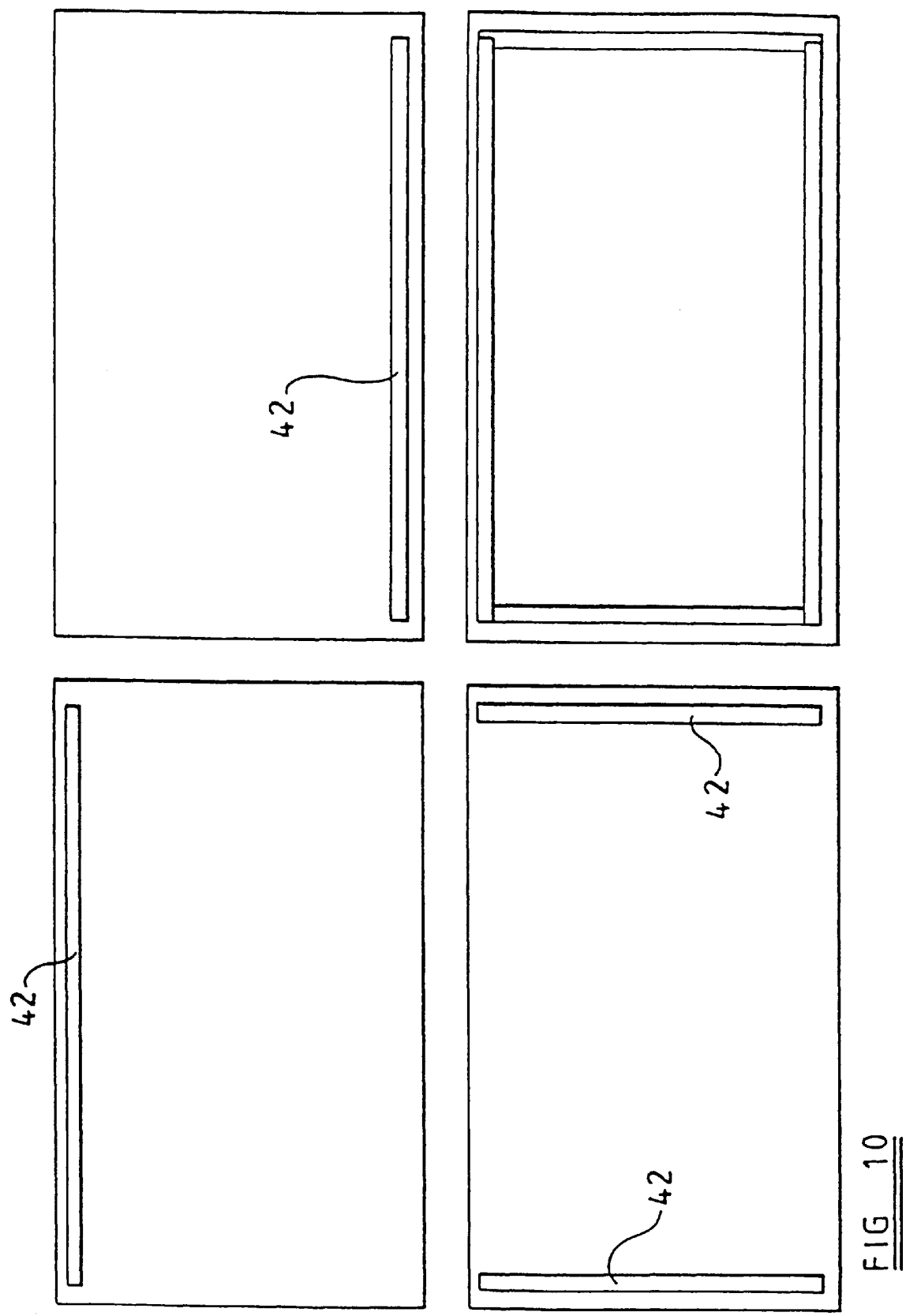
FIG. 10 illustrates possible sensor locations for an autostereoscopic 3D display of the type shown in FIGS. 3 and 4.

FIG. 10 illustrates different possible positions for a strip-shaped viewer position indicating arrangement 42. The arrangement may comprise a horizontal strip located at the top of the display as described hereinbefore and illustrated in the upper left part of FIG. 10. The upper right part of FIG. 10 illustrates an alternative position at the bottom of the display. The lower left part of FIG. 10 illustrates vertical strips at opposite sides of the display. The lower right part of FIG. 10 illustrates an arrangement which combines the upper and lower horizontal strips and the vertical strips at opposite sides. The preferred arrangement is a horizontal strip as illustrated at the upper left and right parts of FIG. 10 so as to provide the observer with maximum awareness of the onset of a poor viewing position. The strip 42 will illuminate at different points along its width if the observer is not at the plane of the viewing windows as described hereinafter.

FIG. 11a illustrates an LCD pixel arrangement in which the upper three rows 43 of pixels are used to provide the viewer position indication. The upper and lower of the rows 43 are controlled so as to be opaque whereas the middle row is controlled such that pairs of adjacent transparent pixels alternate with pairs of adjacent opaque pixels. This effectively provides alternating light and dark pixels having twice the width and twice the pitch of the remaining display pixels.

The display pixels are arranged as alternating columns for displaying left and right eye image data as indicated by different densities of shading, for instance at 44 and 45, respectively. FIG. 11b illustrates the appearance of the viewer position indicating (VPI) pixels such as 46 and image pixels such as 47. The pixels have a black background produced by the black mask of the SLM. More rows of pixels may be used to increase the visibility of the indicating arrangement.

FIG. 12 illustrates the appearance of the indicating arrangement. The upper row shows the pixel appearance, the lower row shows the appearance of the arrangement to an observer in an orthoscopic viewing position, and the bottom row shows the appearance to one eye of an observer in a pseudoscopic viewing position. Crosstalk of typically two to three percent in the display results in the strip shown at 50 being effectively two to three percent brighter than the adjacent horizontal strips and hence possibly being visible against the background to the observer in an orthoscopic position. As shown in FIG. 13, this may be overcome by arranging for the adjacent background strips to add the appearance of "97%" black compared with the "100% black" appearance of the dark pixels in the active row or rows taking into account the display "gamma". Thus, when the observer is in an orthoscopic viewing position, the active row or rows are substantially invisible against the adjacent rows so that no misleading indication is given to the observer.

Figure 14:
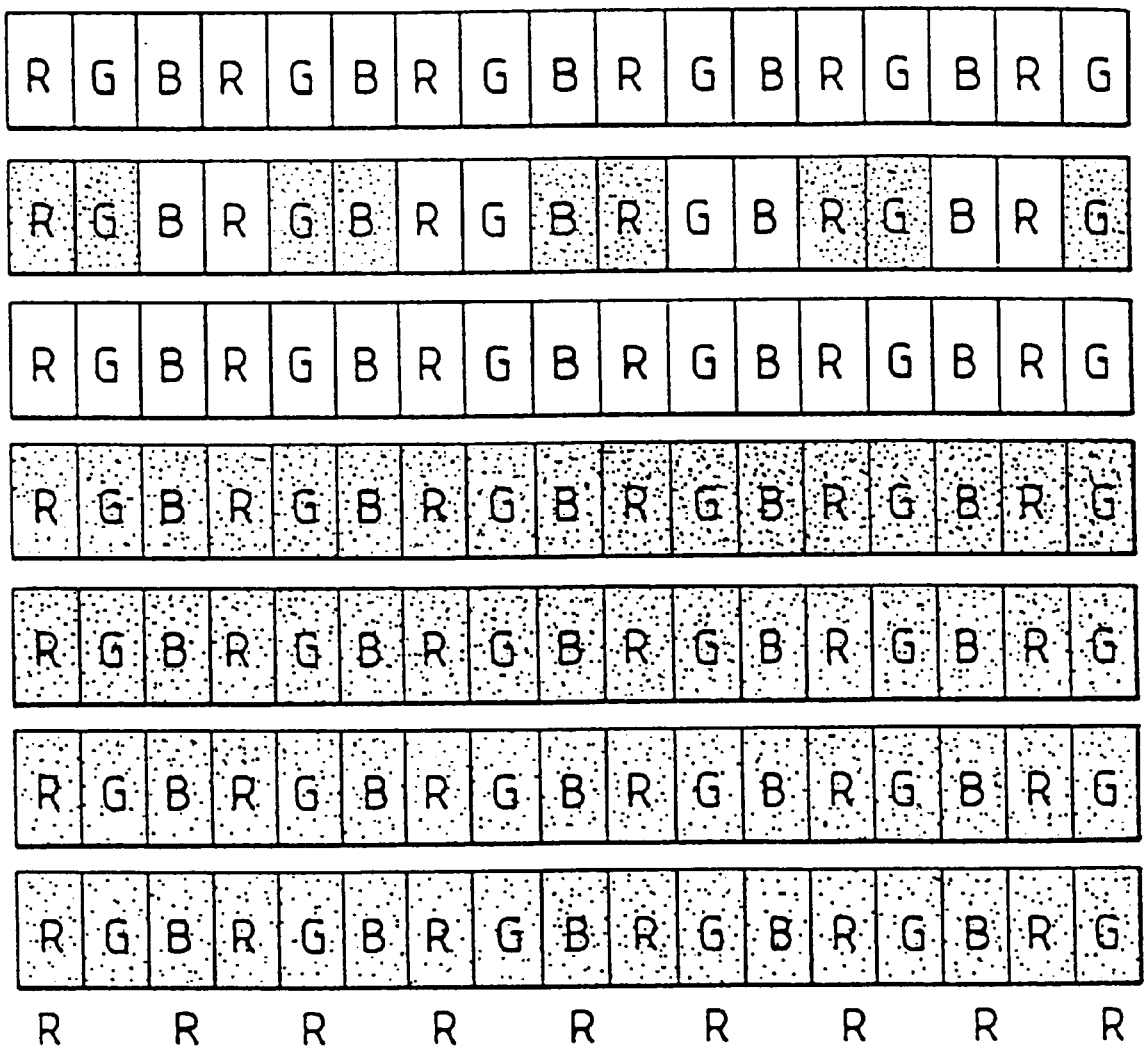
FIG. 14 illustrates an SLM colour stripe panel filter arrangement for the display of FIGS. 3 and 4.
Figure 15:
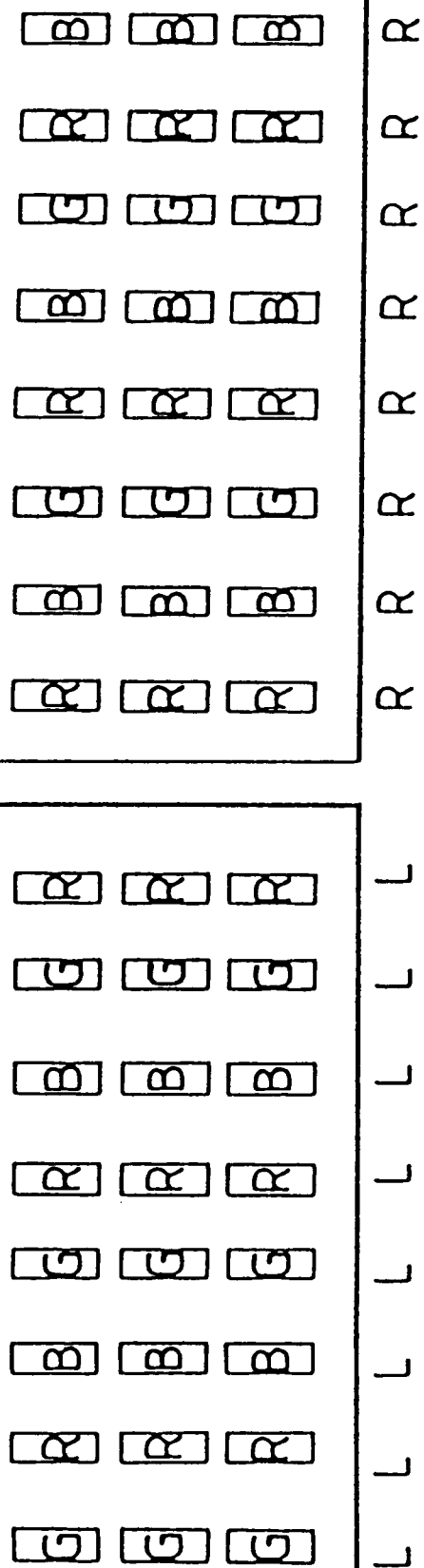
FIGS. 15 and 16 illustrate the panel image appearance to an observer when viewing an orthoscopic image and a pseudoscopic image, respectively.
Figure 16:
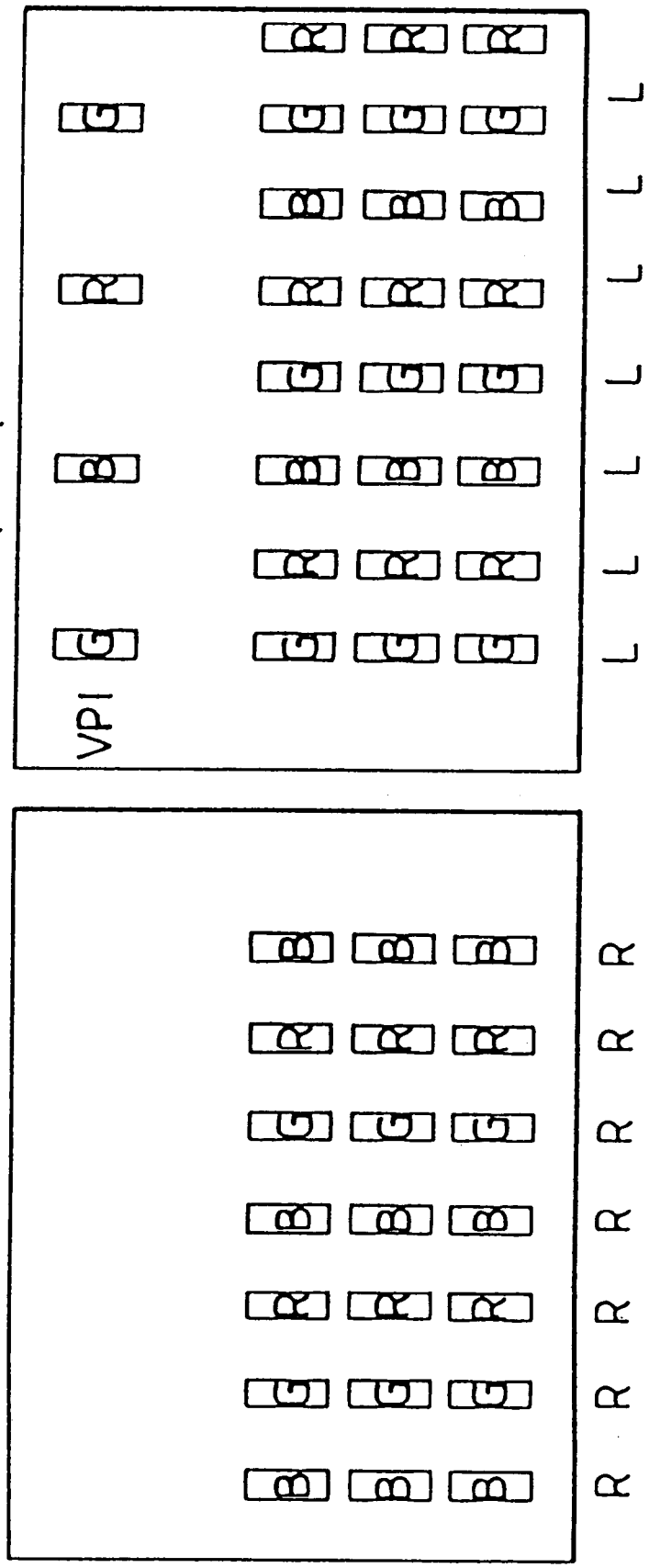

FIG. 14 illustrates a possible colour stripe panel filter arrangement for the SLM 2 in order to provide a full colour display. Red, green and blue colours for the pixels are indicated by R, G and B, respectively. An example of the appearance of the display to the left and right eyes of an observer in an orthoscopic position is shown in FIG. 15 whereas that for an observer in a pseudoscopic position is shown in FIG. 16. For the orthoscopic position as shown in FIG. 15, the VPI pixels are not visible whereas, for the pseudoscopic position illustrated in FIG. 16, the VPI pixels are visible, in this case to the right eye of the observer. It would be possible to make use of a single colour such as red for the position indication, for instance by turning on only VPI pixels of the same colour. However, this results in a reduction in the brightness and resolution of the position indication. In order to avoid this, the VPI pixels may be aligned with colour filtering of a single colour.

Figure 17:
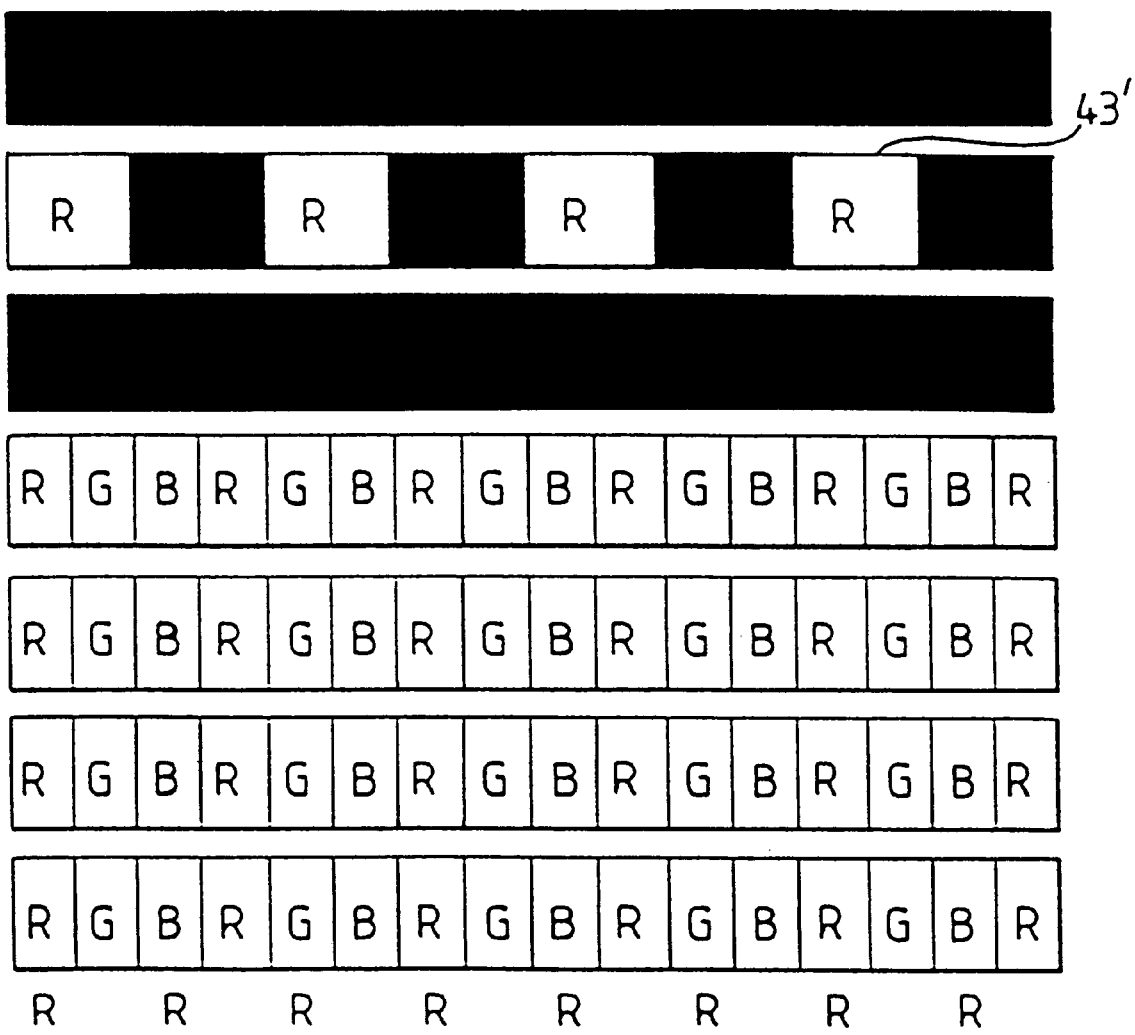
FIG. 17 illustrates another SLM arrangement suitable for the display shown in FIGS. 3 and 4.

FIG. 17 illustrates an arrangement which differs from that shown in FIG. 11a in that the upper three rows 43 of pixels are replaced by a passive arrangement. Because the display information of these pixels is fixed, the part of the SLM which forms the viewer position indicating pixels can also be fixed. Thus, the upper part of the SLM does not need to be controlled. The pixels 43' are defined by the black mask of the SLM and are not provided with addressing electrodes because they are permanently transmissive. The pixels 43' are shown in FIG. 17 as being covered by a red filter so that the viewer position indication is provided in the form of a red horizontal strip and the liquid crystal for these pixels is not controlled. If more convenient, the pixels 43' may be formed by extensions of the SLM substrates and black mask beyond the area of the SLM containing the liquid crystal. In another embodiment, the pixels 43' are controlled by a single electrode which may be used to switch the whole of the indicating arrangement on and off.

Figure 18:
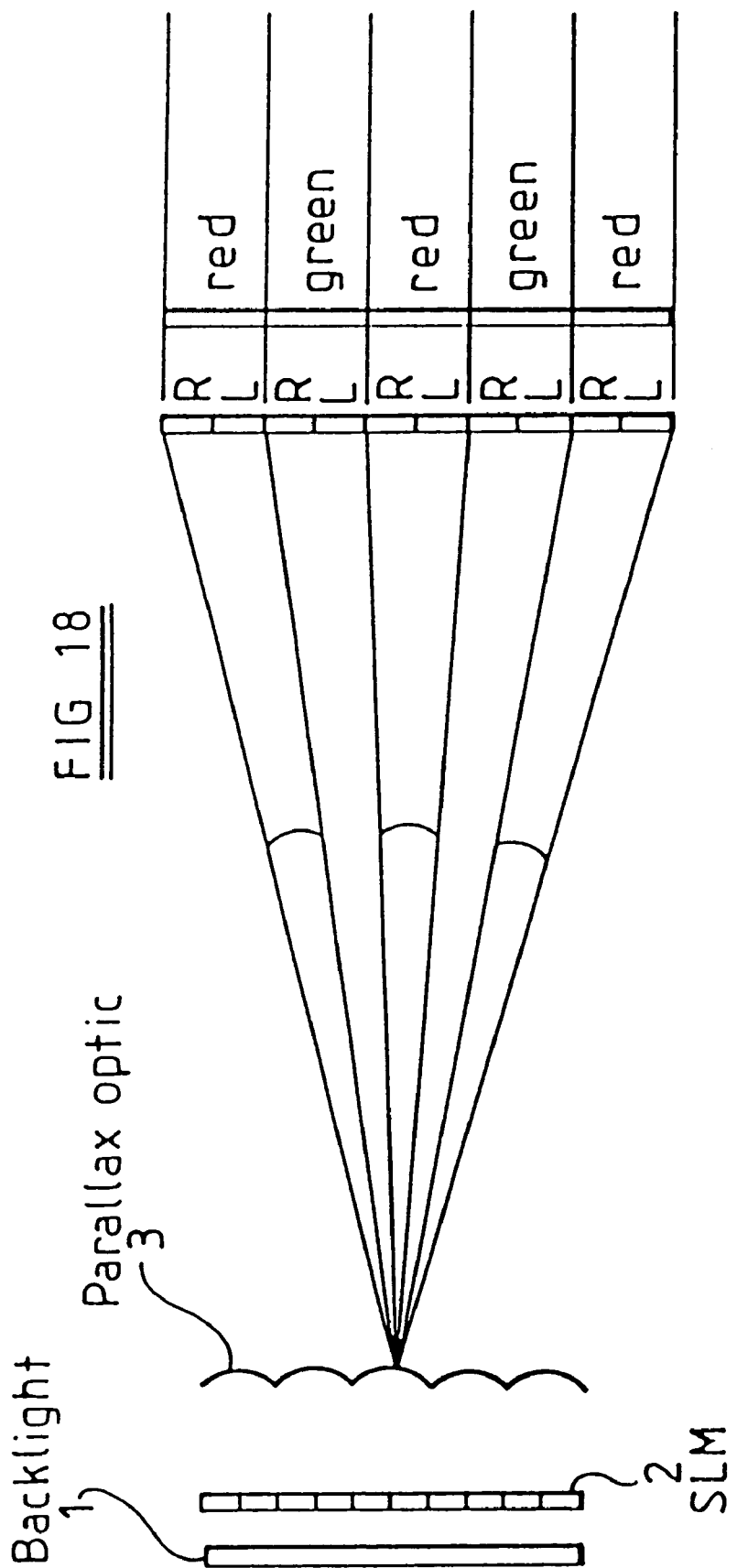
FIG. 18 is a view similar to FIG. 3 illustrating another way of indicating correct viewer positioning.

The display described hereinbefore provides an indication of viewer position in the form of bright and dark zones. Alternatively, alternating zones of different colours may be provided and such an arrangement is illustrated in FIG. 18. This may be provided by arranging for all of the pixels, for instance of the active row or rows within the top rows 43 of FIG. 11, to be transparent but with colour filtering such that alternate pairs of pixels are of different colours. The observer has to detect the difference between pure and mixed colours in order to find the best viewing positions. However, the intermediate orthoscopic viewing positions 18 and 20 which are unused in the displays described hereinbefore may again be used. The observer positions himself so that both eyes see the same colour on the viewer position indicating arrangement. If the observer moves away from the orthoscopic viewing zones, the eyes of the observer will see different colours.

FIG. 19 illustrates an arrangement in which images hatched in opposite directions are visible in alternate viewing zones such as zone 1 and zone 2. A cross-hatched appearance occurs for the pseudoscopic zone as shown at the bottom of FIG. 19.

The indicator arrangement may provide images which are red, green, white, flashing colours or text or symbols such as arrows for helping the observer to determine the correct direction of movement to return to an orthoscopic viewing zone.

The arrangements described hereinbefore are mainly concerned with achieving the correct lateral or horizontal position of the observer and will work for a range of vertical observer positions. However, if the vertical position of the observer is also required, for instance for finding the best vertical viewing position, a vertical position indicator may be provided as illustrated in FIG. 20. A horizontal viewer position indicating arrangement of the type described hereinbefore is provided and is supplemented by vertical position indicating arrangements 51. Each arrangement 51 comprises a horizontal parallax barrier as illustrated at 52 and a pixel arrangement as illustrated at 53. When the observer is disposed at the correct height, the arrangements 51 appear bright as illustrated at 54. However, when the observer is not at the correct height, the arrangement appears dark as illustrated at 55. Alternatively, the light and dark indications may be reversed so as to have dark appearance at the correct height and light appearance at the incorrect height.

In order to optimise the viewer location more accurately so as to improve display quality, the viewing freedom of the viewer position indicating arrangement may be made more restricted than for indicating orthoscopic viewing to the observer. Alternatively or additionally, the pixel shape of the arrangement may be adjusted to minimise the viewing freedom and thus optimise the observer location.

Figure 21:
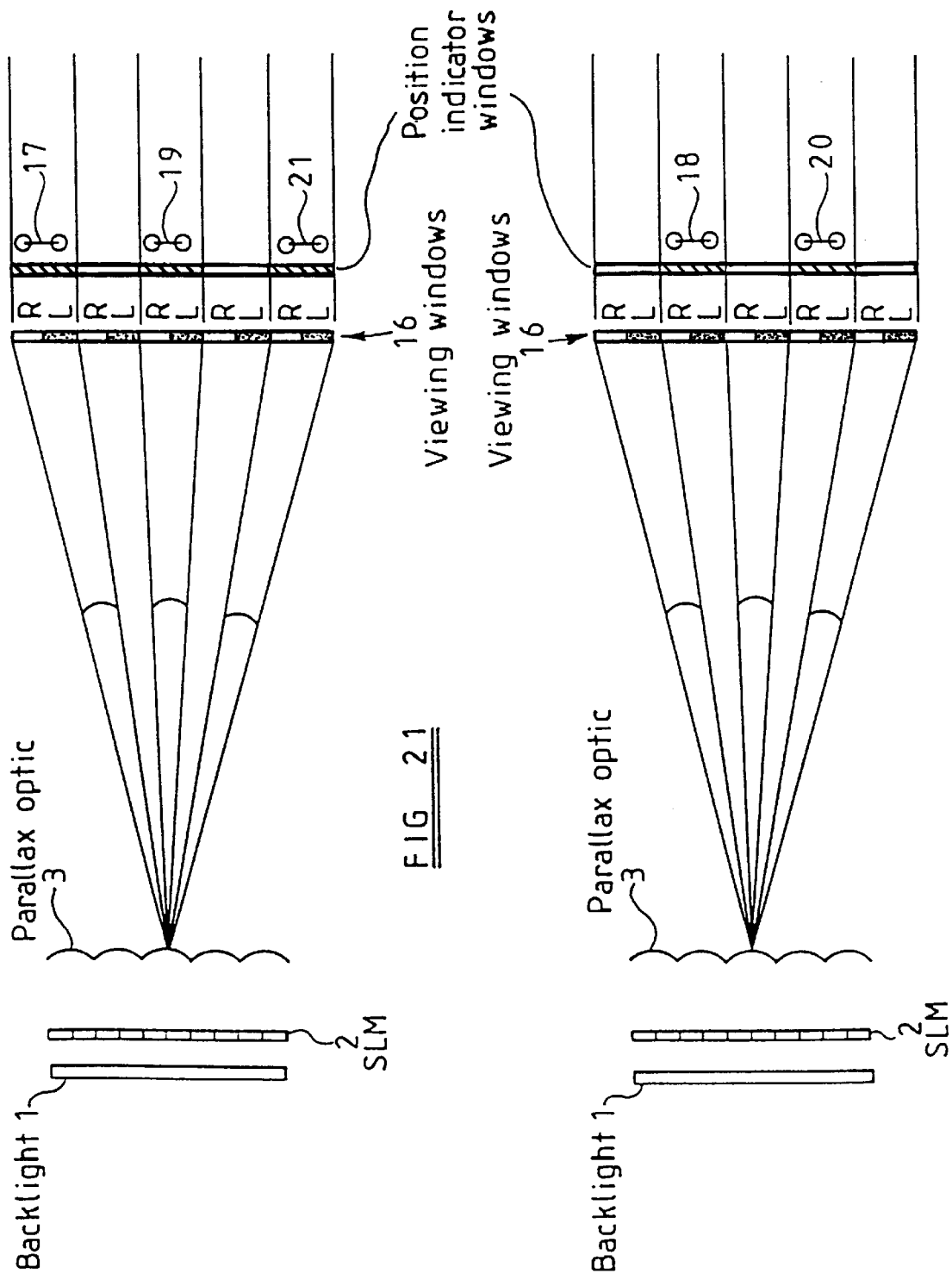
FIG. 21 shows two views similar to FIG. 3 illustrating operation in two different modes.

The displays described hereinbefore and illustrated in the accompanying drawings are configured for a central observer with other observers able to see the 3D image in lobes to the side of the central viewing window. However, in some applications such as video games, two "side-by-side" observers may be preferable. This may be achieved by changing the image data from the previously described arrangement shown at position 1 in FIG. 21 to the arrangement shown at position 2. This merely requires altering the states of the pixels of the viewer position indicating arrangement. Thus, the display may be electronically switchable between the two modes with no moving parts.

FIG. 22 illustrates a laptop computer 60 having a display in the form of an autostereoscopic display as described hereinbefore. The display includes a parallax optic 3 in the form of a parallax barrier of the type illustrated in FIG. 4. The upper part of FIG. 22 illustrates use of the display in the autostereoscopic 3D mode. The parallax barrier is disposed in an attachment 61 so as to be in correct registration with the pixels of the SLM within the display. For instance, the barrier may be made on a glass or acrylic substrate whose coefficient of thermal expansion is sufficiently close to that of the glass of the LCD forming the SLM. The barrier apertures can be manufactured from an exposed and developed photographic emulsion. Such an exposure can be produced with 0.1 $\mu$m tolerances using a flat bed laser scanning apparatus.

The lower part of FIG. 22 illustrates a 2D mode of operation in which the parallax barrier 3 is removed from the attachment 61 and, for instance, stored in a suitable receptacle or pouch at the back of the display. This allows the full spatial resolution of the SLM to be used in the 2D mode.

Other arrangements are possible for permitting the parallax barrier to be removed or disabled for the full resolution 2D mode. For instance, the barrier may be hinged to the top of the display or may be on a roller blind which can be pulled down in front of the SLM 2 when required. Alternatively, an array of half waveplate 90 degree polarisation rotators, which may be half waveplates, may be provided, for instance by patterning onto a layer which can be attached to an output polariser of the SLM 2 or on a separate sheet which is mounted near to the output polariser and aligned with the display. In the 2D mode, this is not visible. However, by disposing an additional polariser in front of the display, areas having 90 degree rotators transmit light whereas those without such rotators extinguish light to form the parallax barrier. The additional polariser is not required to be patterned so that its alignment with the display is less critical. Such a polarising layer can be made more robustly than a removable parallax barrier and is not affected by thermal expansion differences. Alignment tolerances are significantly reduced compared with alignment of the barrier itself.

Figure 23A:
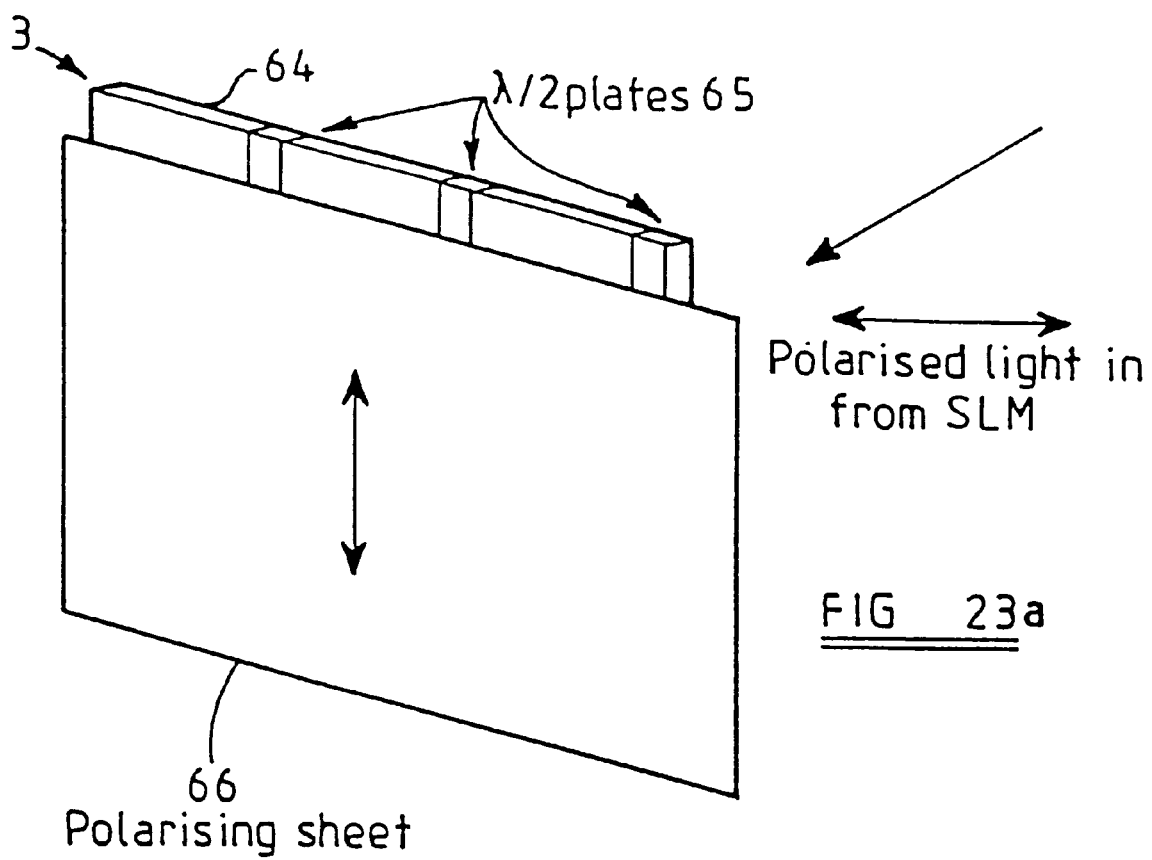
FIG. 23a illustrates a first arrangement for switching between 3D and 2D modes.

An arrangement of this type is shown in FIG. 23a. The parallax optic 3 comprises a substrate having portions 64 which do not affect polarisation and strip-shaped portions 65 which act as half waveplates. In the 3D mode, a linearly polarising sheet 66 is disposed over the substrate. Polarised light from the SLM 2 passes through the regions 64 unchanged but the light passing through the half waveplates 65 has its polarisation vector rotated by 90 degrees. The polarising direction of the polarising sheet 66 is perpendicular to the direction of polarisation of the incoming light so that light passing through the regions 64 is extinguished whereas light passing through the half waveplates 65 is transmitted. When the display is required to operate in the full resolution 2D mode, the polarising sheet 66 is removed so that all light from the SLM 2 is transmitted.

90 degree rotators, such as half waveplates, tend to be optimised for a particular wavelength. Thus, in the 3D mode, light transmitted through the slits may become slightly coloured. Single layer retarder elements may be appropriate for this application but chromatic performance may be improved by using multi-layer retarder structures. Any light transmitted through the regions between the slits would result in undesirable image crosstalk. However, no polarisation modification is used in the regions between the slits so that most of the light is absorbed by the polarising sheet 66 which may have good broadband absorption properties. Accordingly, display crosstalk can be minimised.

Figure 23B:
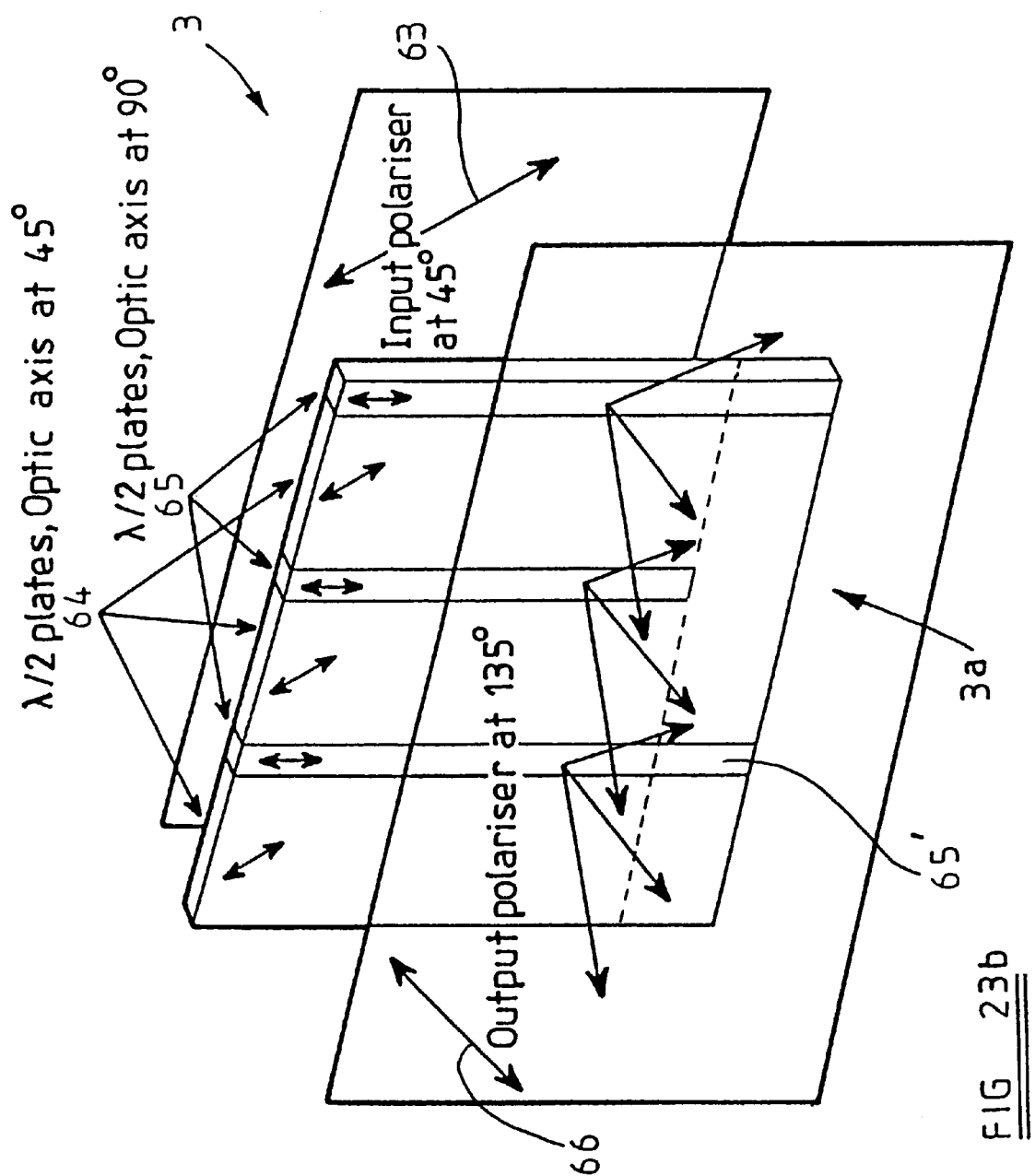
FIG. 23b illustrates a second arrangement for switching between 3D and 2D modes.

FIG. 23b illustrates an arrangement of a type similar to that shown in FIG. 23a. However, the portions 64 and 65 all comprise half waveplates, but with their optic axes differently aligned. An input polariser 63 is shown with its polarising axis at 45° to a reference direction (horizontal). The input polariser 63 is generally constituted by an output polariser of the SLM 2 when embodied as an LCD. The optic axes of the portions 64 are aligned at 45° and are therefore parallel to the polarisation vector of light from the input polariser. The portions 64 thus have substantially no effect on the polarisation so that light passing through the portions 64 is absorbed by the output polariser 66, whose polarising axis is aligned at 135°.

The optic axes of the portions 65 are aligned at 90° so that the polarisation vector of light passing through the portions 65 is changed to 135° and is transmitted by the output polariser. Thus, with the output polariser in place, a parallax barrier is formed to provide 3D viewing. By removing the output polariser from the optical path, a full resolution 2D mode is provided.

Alternate ones of the portions 65 are extended downwardly as shown at 65' to form the barrier portion 3a in the 3D mode to provide the viewer position indication. However, when the output polariser is removed, the whole of the SLM is available for displaying 2D images.

Figure 24:
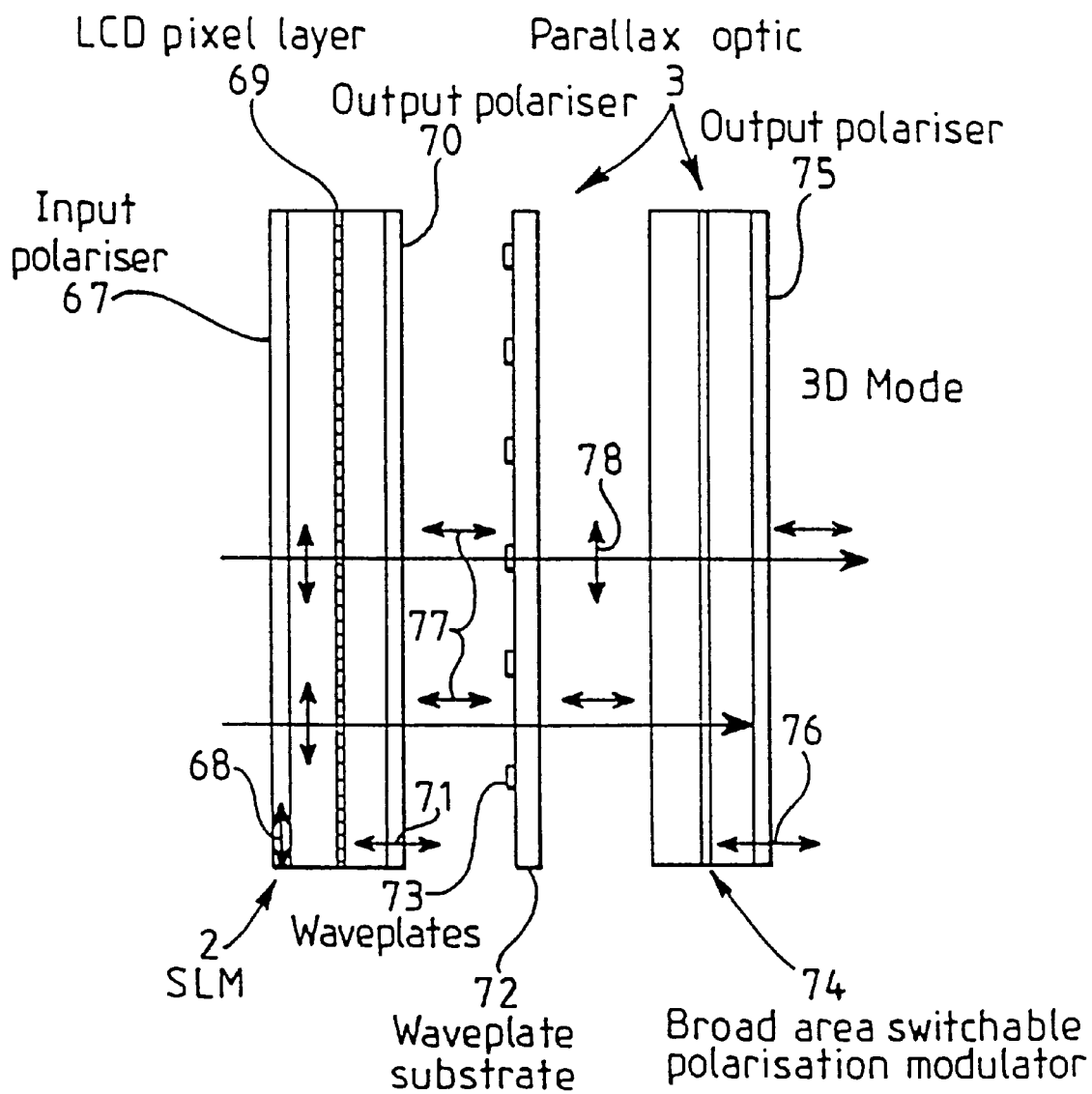
FIGS. 24 and 25 are diagrammatic cross-sectional views of a third arrangement operating in 3D and 2D modes.

FIG. 24 illustrates another arrangement for switching between 3D and 2D modes. The SLM 2 comprises an LCD comprising an input polariser 67 having a polarisation direction illustrated by a double headed arrow 68, a liquid crystal pixel layer 69, and an output polariser 70 having a polarisation direction indicated by a double headed arrow 71. A waveplate substrate 72 is disposed adjacent the output polariser 70 and comprises a transparent substrate carrying strip-shaped half waveplates 73. The substrate 72 forms part of the parallax optic 3 which also comprises a broad area switchable polarisation modulator 74 and an output polariser 75 having a polarisation direction indicated by the double headed arrow 76.

In the 3D mode illustrated in FIG. 24, output light from the SLM 2 is polarised in the direction indicated by the double headed arrows 77. Light passing through the waveplates 73 has its polarisation direction rotated by 90 degrees so as to be in the direction indicated by the double headed arrow 78. Light passing through the substrate 72 between the waveplates 73 is unaffected. The polarisation modulator 74, which may for instance comprise a twisted nematic cell or pi cell, is controlled so as to have no effect on polarisation so that the output polariser 75 passes light with the polarisation 78 but extinguishes light with the polarisation 77. The parallax optic 3 therefore functions as a parallax barrier.

Figure 25:
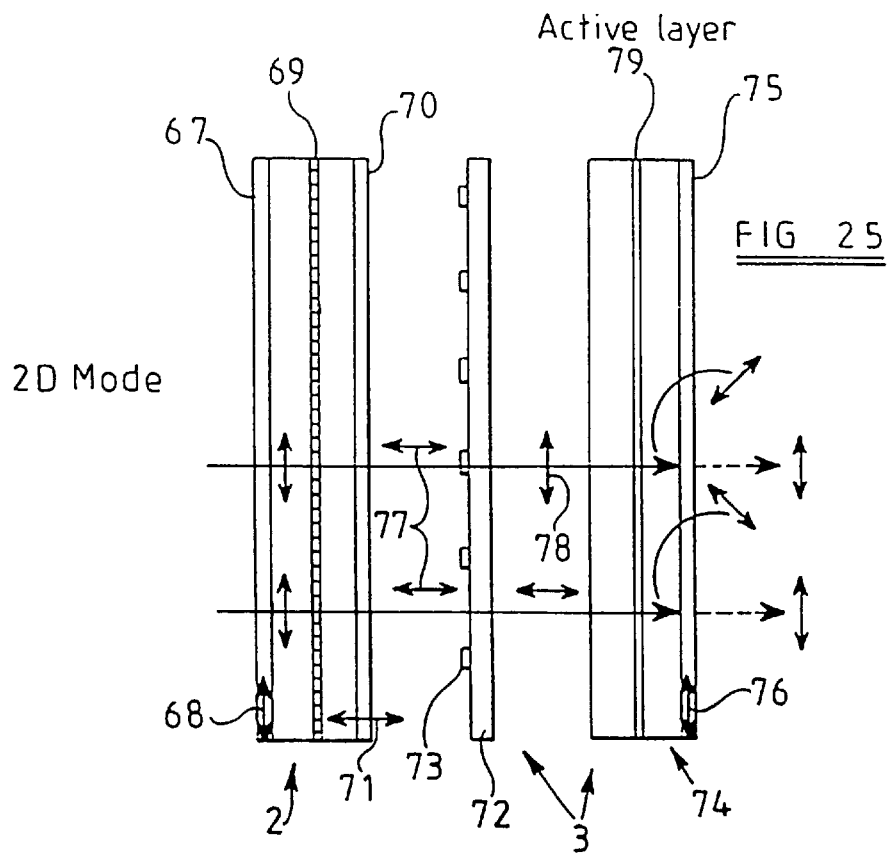

FIG. 25 illustrates operation in the full resolution 2D mode. In this mode, the active layer 79 of the polarisation modulator 74 is controlled so as to rotate the polarisation of incoming light by 45 degrees. The active layer 79 may achieve this by rotating the polarisation by 45 degrees or by applying a quarter wave phase shift. Thus, light from all parts of the substrate 72 including the waveplates 73 is incident on the output polariser 75 with a polarisation direction at 45 degrees to the polarising axis 76 of the polariser 75 or with circular polarisation. Accordingly, the output polariser 75 transmits light from all regions of the substrate 72 with substantially the same relatively low attenuation and the parallax optic effectively disappears.

Figure 26:
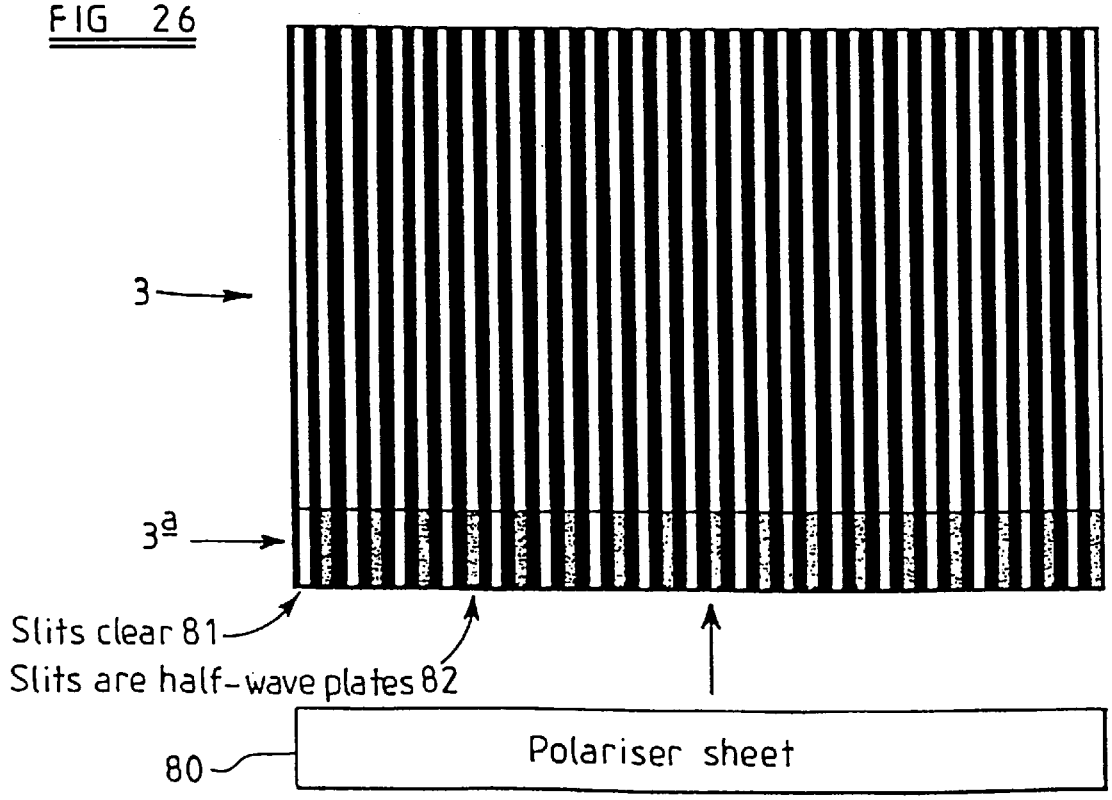
FIG. 26 illustrates a parallax optic arrangement for providing two 3D modes.

For some applications, it may be desirable to be able to switch between a 3D mode including viewer position indication by means of part of the SLM and a 3D mode using the whole of the SLM for image display. An arrangement for achieving this is shown in FIG. 26. The arrangement effectively comprises a modified parallax barrier 3 and a polarising sheet 80. The lower portion 3a of the parallax barrier comprises clear slits 81 which are used for providing the viewer position indication and slits 82 which are half waveplates and which are not required to provide viewer position indication. As described hereinbefore, light from the SLM is linearly polarised so that light passing through the slits 81 is unaffected whereas light passing through the slits 82 has its polarisation axis rotated by 90 degrees. When viewer position indication is required, the polarising sheet 80 is disposed over the portion 3a of the parallax barrier 3 and has a polarisation axis such that light passing through the slits 81 is transmitted whereas light passing through the slits 82 is extinguished. In this mode, the parallax barrier 3 functions in the same way as that illustrated, for instance, in FIG. 9. When viewer position indication is not required and the whole area of the display is to be used for image display, the polarising sheet 80 is removed so that the slits 81 and the slits 82 effectively form extensions of the other slits of the parallax barrier 3.

In the arrangements described hereinbefore, some of the rows of pixels of the SLM 2 are used to provide position indication. This results in some loss of resolution and image size of the 3D image. However, this may be regained by providing additional pixels specifically for position indication and, for instance, only capable of being switched between a colour and black. The processing electronics requirement associated with such pixels is small so that driver cost need not be substantially affected. Because the data for such pixels are fixed for each mode of operation, devices such as thin film transistors would not be necessary for controlling these pixels.

Figure 27:
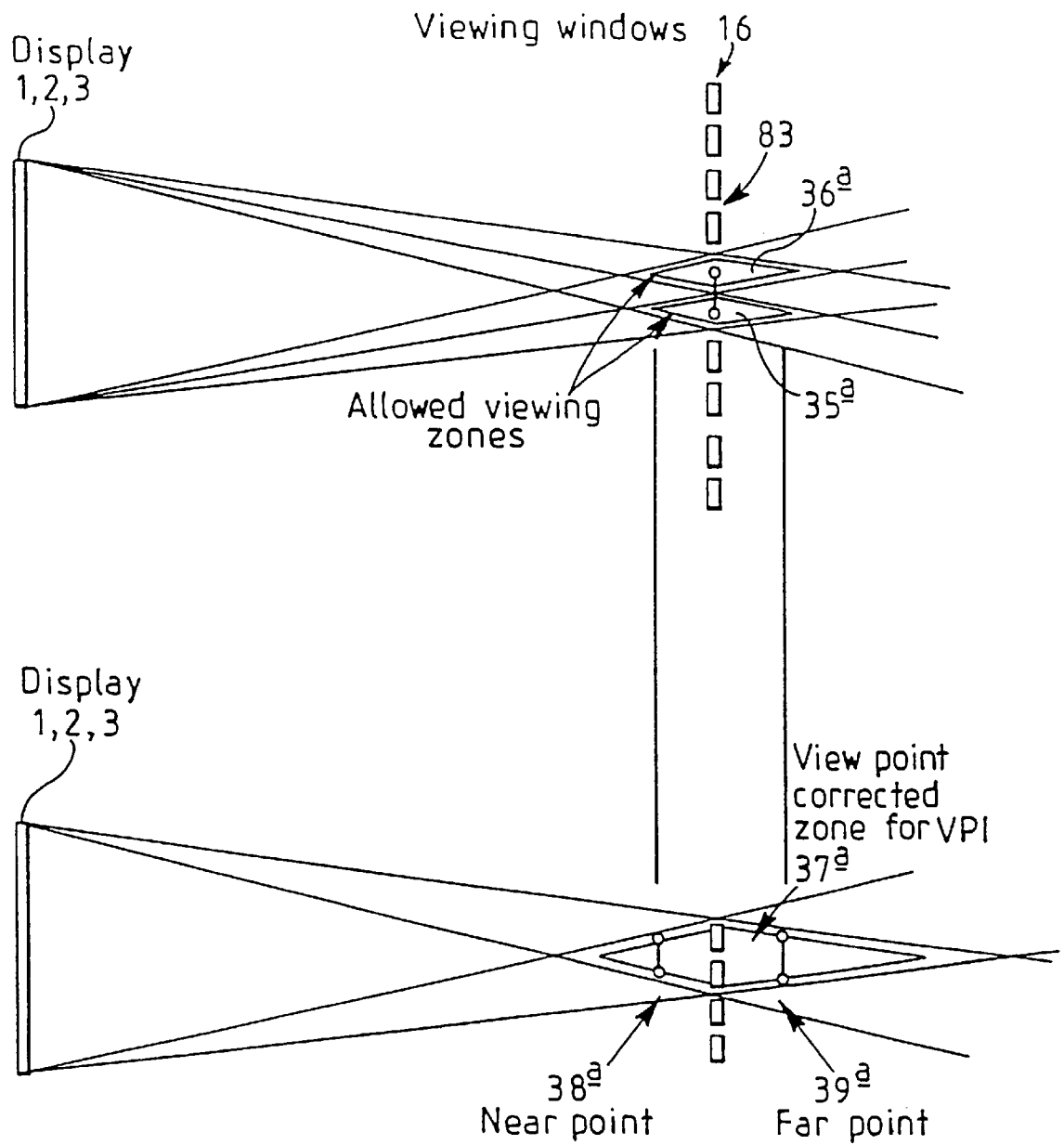
FIG. 27 is a view similar to FIG. 7 illustrating the effect of pixel columns laterally separated by continuous strips of a black mask.

FIG. 27 illustrates the effect of using an SLM 2 having pixels arranged in columns but with the columns laterally separated by continuous vertical strips of a black mask of the SLM. The upper part of FIG. 27 illustrates that the viewing windows 16 are no longer laterally contiguous but are separated by vertical strips such as 83 where the vertical black mask strips are imaged. Thus, the allowed viewing zones 35a and 36a are more spatially restricted than the viewing zones 35 and 36 shown in FIG. 7. However, as shown in the lower part of FIG. 27, the same effects are present in the viewer position indicating arrangement such that a reduced viewpoint corrected zone 37a having near and far points 38a and 39a closer to the plane of the viewing windows is produced. The reduced zone 37a corresponds to the reduced zones 35a and 36a so that correct viewer position indication is given for this embodiment.

Figure 28:
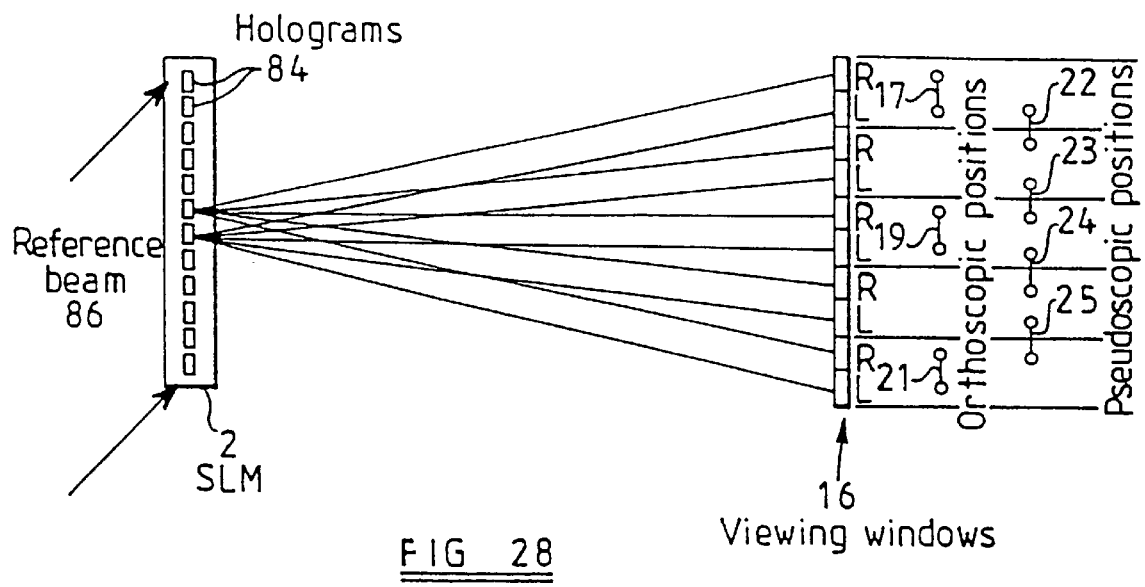
FIGS. 28 and 29 are views similar to FIGS. 3 and 4, respectively, showing another display constituting an embodiment of the invention.
Figure 29:
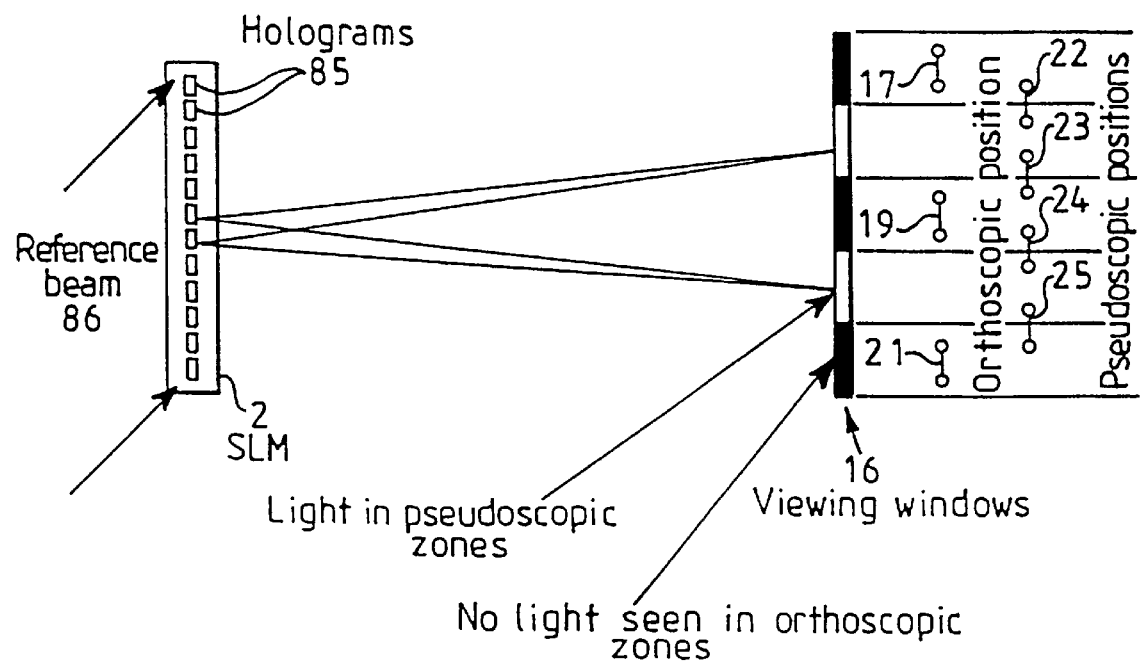

FIGS. 28 and 29 show an autostereoscopic 3D display which differs from that shown in FIGS. 3 and 4 in that the parallax optic 3 comprises a sheet carrying holograms 84 and 85 for forming the viewing windows 1 6. Each hologram 84, 85 is disposed nominally at the plane of the pixels of the SLM 2, although the pixels may alternatively be imaged onto the holograms for the same effect. The display is illuminated by a reference beam 86 and each of the holograms 84 produces a set of viewing windows, each of which has a lateral width substantially equal to the interocular separation of an observer. Similarly, the holograms 85 for providing the viewer position indication give rise to windows, each of whose width is substantially equal to twice the interocular separation.

The use of holograms has the advantage that left and right eye image data may be interlaced horizontally on rows of the SLM 2. Thus, the cost of an image interlacing system may be reduced. However, the imaging property of the holograms still allows the generation of the illustrated viewing position indication window configuration.

In order to improve diffraction efficiency, each hologram may be arranged to produce a single viewing window so that an array of pixels, each with its own hologram, is required to produce the array of windows.

All of the pixels in the viewer position indicating arrangement may be used to generate the illuminated windows for providing viewer position indication. Accordingly, a relatively bright indication may be provided.

Figure 30:
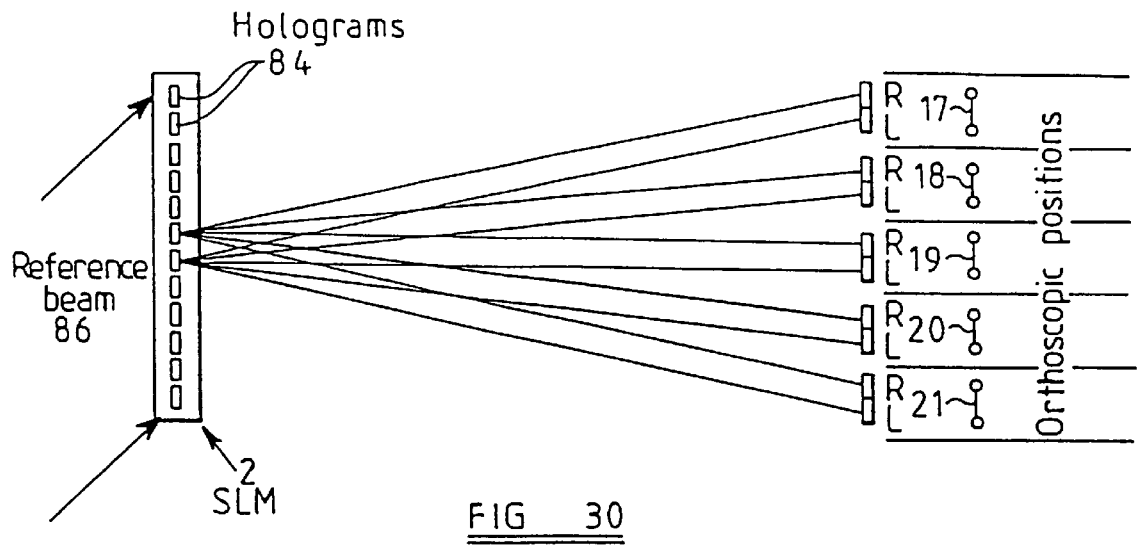
FIGS. 30 and 31 are views similar to FIGS. 3 and 4, respectively, showing a further display constituting an embodiment of the invention.
Figure 31:
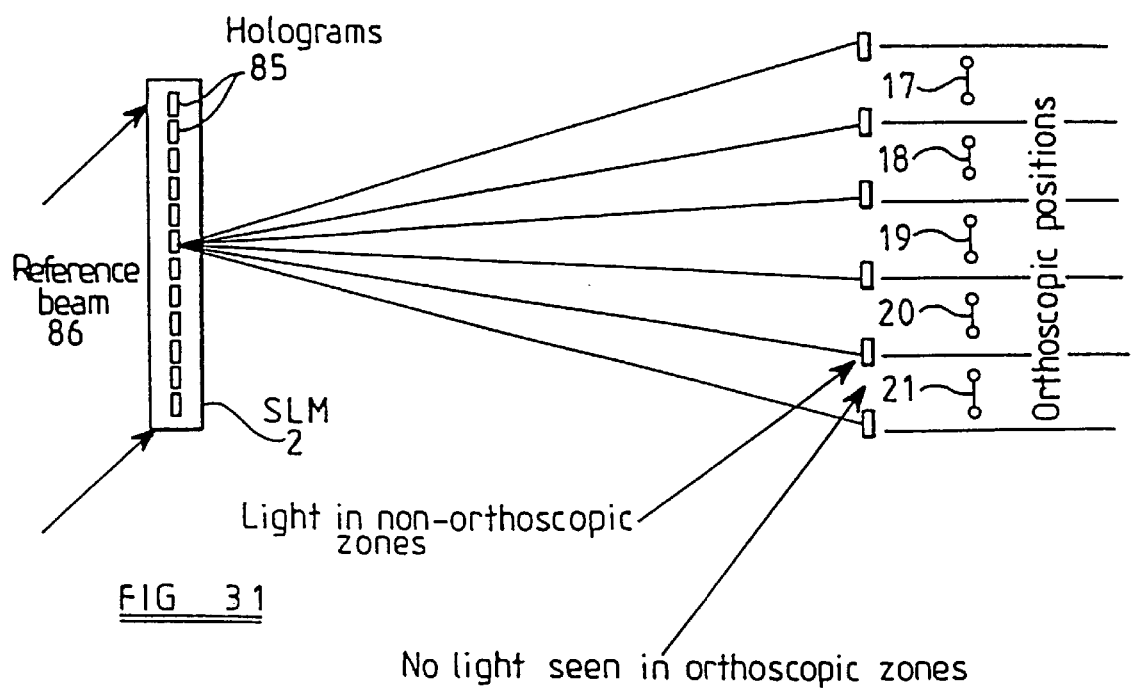

FIGS. 30 and 31 show a display of the same type as shown in FIGS. 28 and 29 but in which the holograms 84 and 85 produce different viewing windows. In particular, the holograms 84 produce windows whose width is substantially equal to the interocular separation of an observer. The viewing windows are disposed in pairs to provide orthoscopic viewing positions 17, 19 and 20 but with the pairs spaced apart so that there are no pseudoscopic positions. The holograms 85 are arranged to direct light to the gaps between the adjacent pairs of windows and give a clear indication if an observer is about to move outside the orthoscopic positions.

Figure 32:
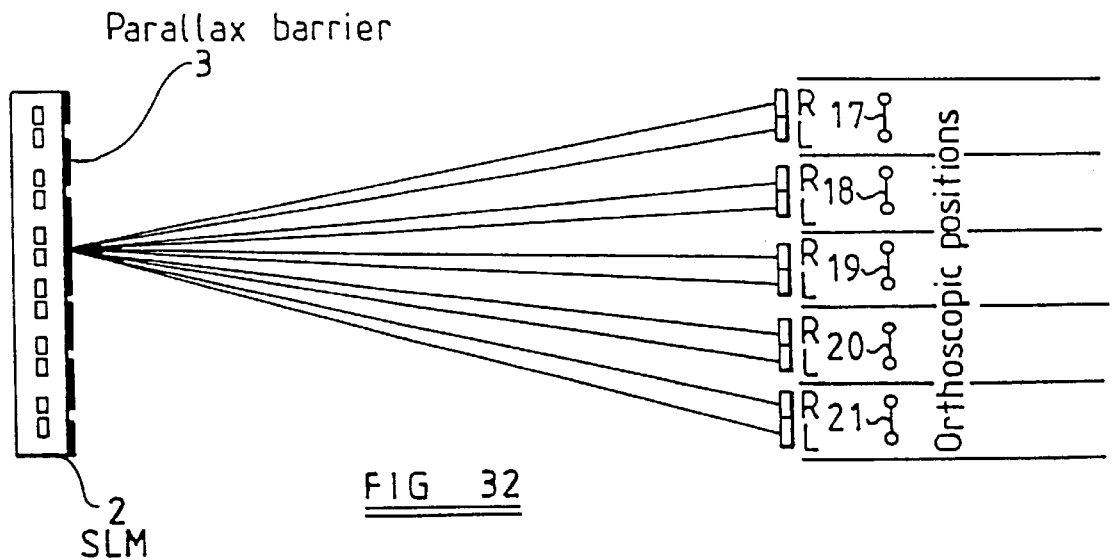
FIGS. 32 and 33 are views similar to FIGS. 3 and 4, respectively, showing yet another display constituting an embodiment of the invention.
Figure 33:
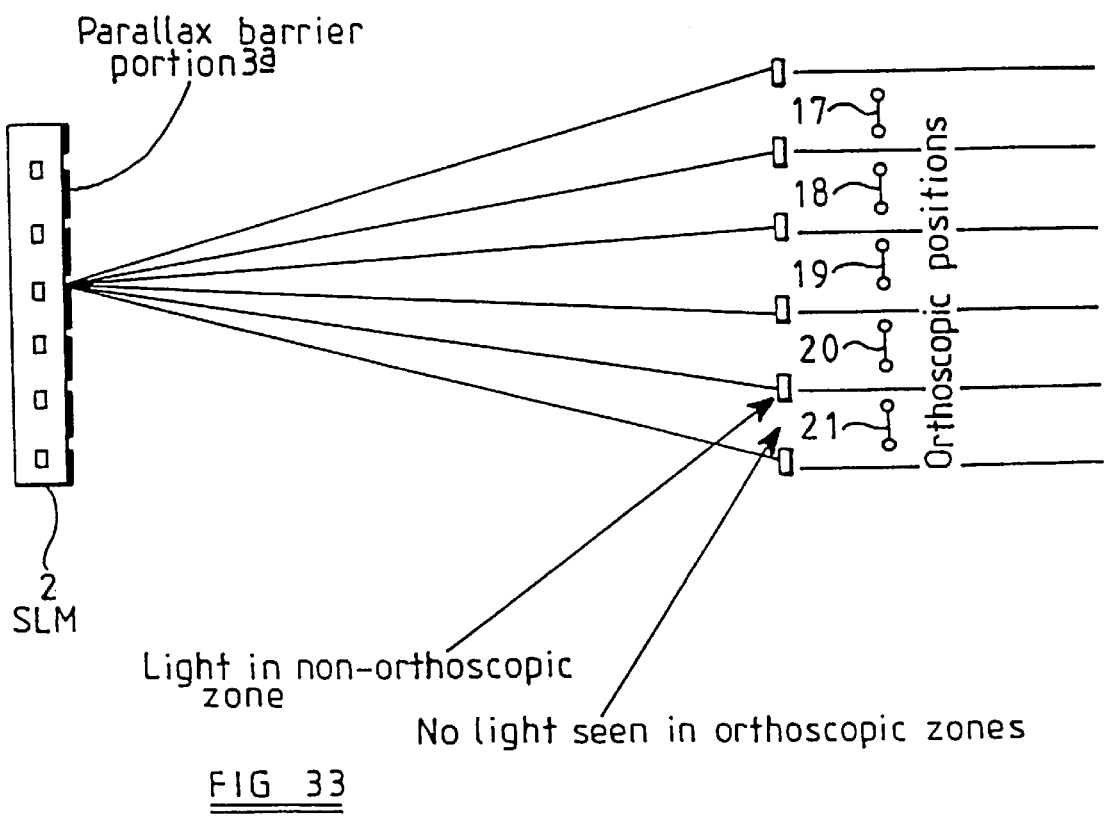

FIGS. 32 and 33 illustrate another autostereoscopic 3D display of the type shown in FIGS. 3 and 4 comprising an SLM 2 and a parallax barrier 3 having a portion 3a for providing viewer position indication. However, the display shown in FIGS. 32 and 33 provides spaced viewing windows of the type illustrated in FIGS. 30 and 31. The pixels of the SLM 2 are arranged as adjacent pairs of columns separated from each other by the black mask of the SLM which gives rise to the spaces between the pairs of viewing windows.

If an eye of an observer is outside the orthoscopic viewing positions 17 to 21, the display as seen by that eye appears to turn black. With real image data, low intensity images with little disparity can cause problems because an observer may drift outside the best viewing zone without realising it until the image returns to a higher intensity value. By providing the viewer position indication with light being visible in the non-orthoscopic zones, an observer can easily check that he is in an orthoscopic viewing position irrespective of the image data being displayed.

FIG. 34 illustrates a display of the type shown in FIGS. 3 and 4 but providing three viewing windows 16 per lobe. Each set of windows provides a left view, a right view and a "black" view as illustrated in FIG. 35. The right eye image 90 has a black strip 91 permanently displayed at its bottom edge. Similarly, left eye image 92 also has a black bottom strip 93. The black view content is illustrated at 94 and comprises a white strip 95 at its bottom edge.

The presence of the black windows eliminates the pseudoscopic viewing positions to leave the orthoscopic positions 17 to 21 and non-orthoscopic positions there between. When an observer is at one of the orthoscopic positions 17 to 21, both eyes see the black strips 91 and 93. However, when an eye of the observer moves to a non-orthoscopic position, that eye sees the white strip 95 of the black window.

Figure 36:
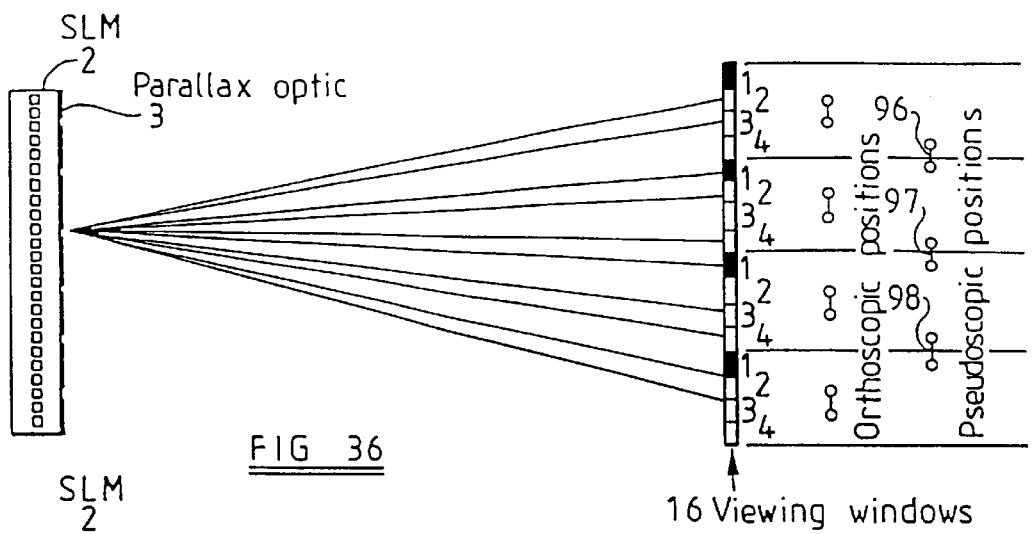
FIGS. 36 and 37 are views similar to FIGS. 3 and 4, respectively, of a four view display constituting an embodiment of the invention.

Although the displays described hereinbefore have provided two views, displays providing a larger number of views may also be provided. For instance, FIG. 36 illustrates a display providing four views (labelled 1 to 4 at the viewing windows 16) in each lobe. An observer therefore has a wide range of viewing freedom with pseudoscopic viewing positions 96, 97 and 98 being present at the boundaries between adjacent lobes.

Figure 37:
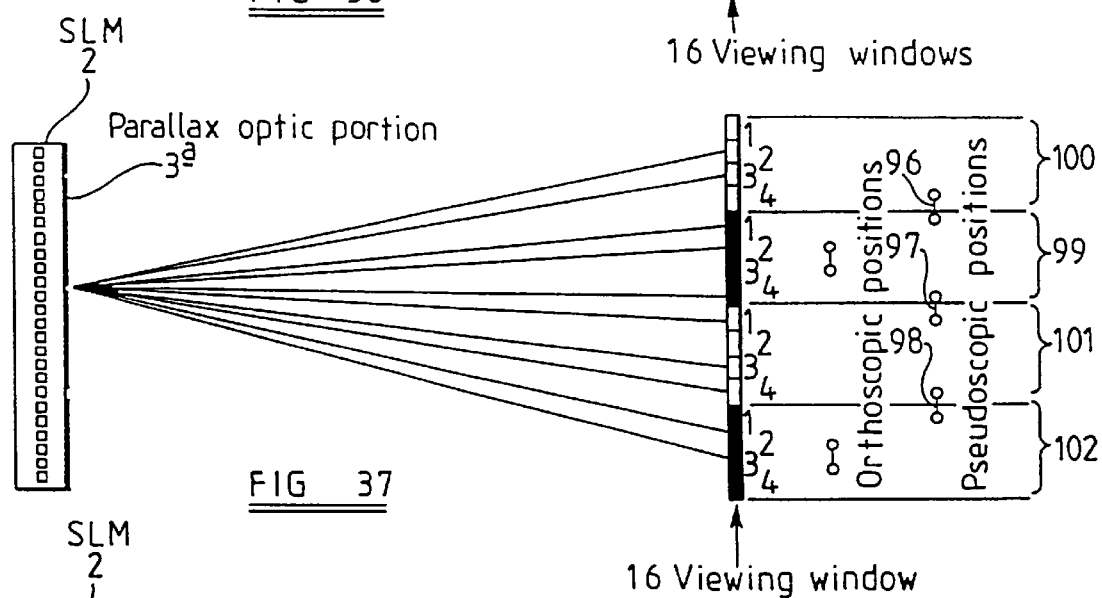

FIG. 37 illustrates a first technique for providing an observer with a visual indication of the pseudoscopic positions. In this arrangement, the parallax optic portion 3a has twice the pitch of the parallax optic 3 so that the indication in a central lobe 99 is dark whereas the indication in adjacent lobes 100 and 101 is bright. The next lobes such as 102 are again dark, and so on. Thus, at pseudoscopic viewing positions, at least one eye of the observer sees a non-black position indication.

Figure 38:
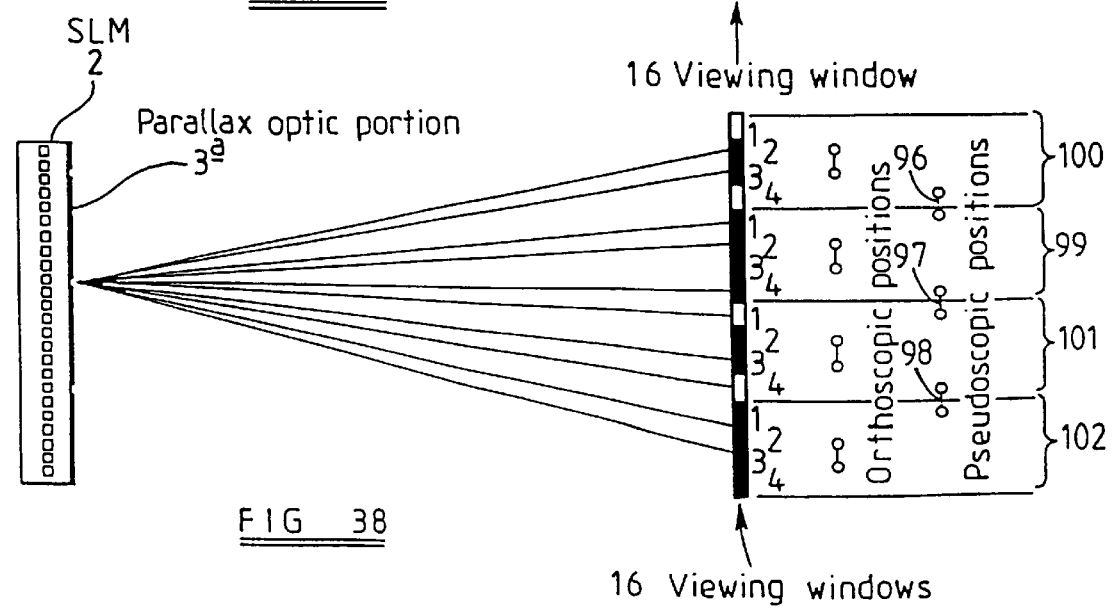
FIG. 38 is a view similar to FIG. 4 showing an alternative viewer position indicating arrangement.

FIG. 38 illustrates an alternative arrangement of viewer position indication. A dark indication is again provided in the central lobe 99. In the next lobes 100 and 101, the central part is dark whereas the edge parts are bright. The next lobes such as 102 are dark and so on. This arrangement allows additional observers to use the display in the intermediate display lobes.

Figure 39:
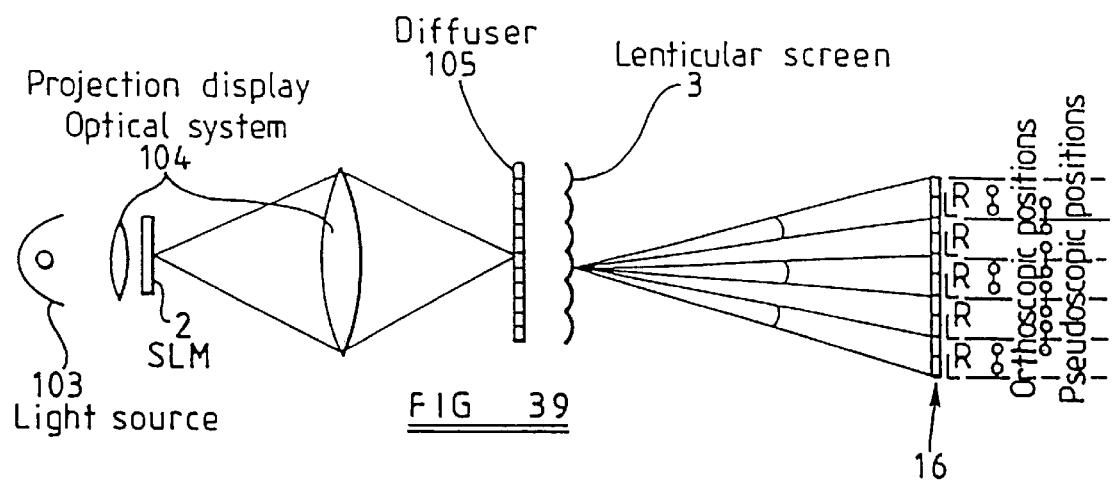
FIGS. 39 and 40 are views similar to FIGS. 3 and 4, respectively of a projection display constituting an embodiment of the invention.
Figure 40:
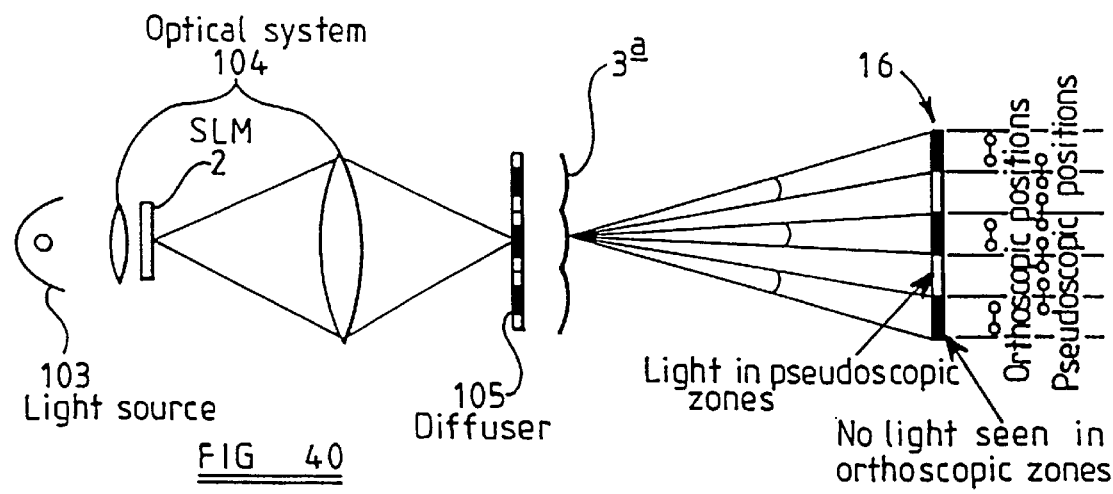

FIGS. 39 and 40 illustrate a projection display in which the backlight 1 is replaced by a projection light source 103 and an optical system 104 projects the images displayed on the SLM 2 onto a diffuser 105 disposed at the rear surface of a lenticular screen 3. The lenticular screen portion 3a shown in FIG. 40 has twice the pitch of the screen 3 for the stereoscopic images and provides a viewer position indication in the same way as the display shown in FIGS. 3 and 4.

Figure 41:
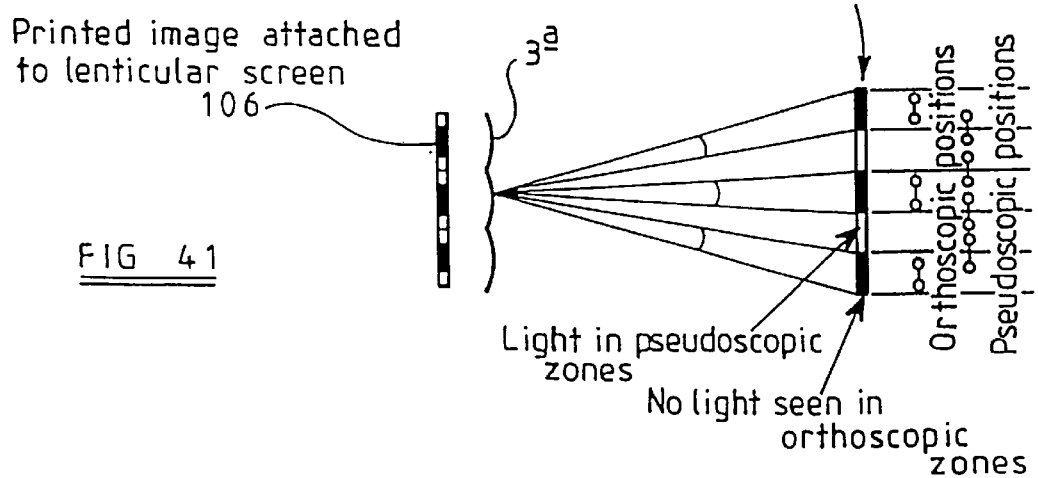
FIG. 41 is a view similar to FIG. 4 showing an alternative viewer position indicating arrangement.

FIG. 41 illustrates an alternative arrangement for providing the viewer position indication. Instead of controlling the position indication pixels of the SLM 2, a printed image 106 is attached to the lenticular screen and is illuminated from behind by the light source 103.

Figure 42:
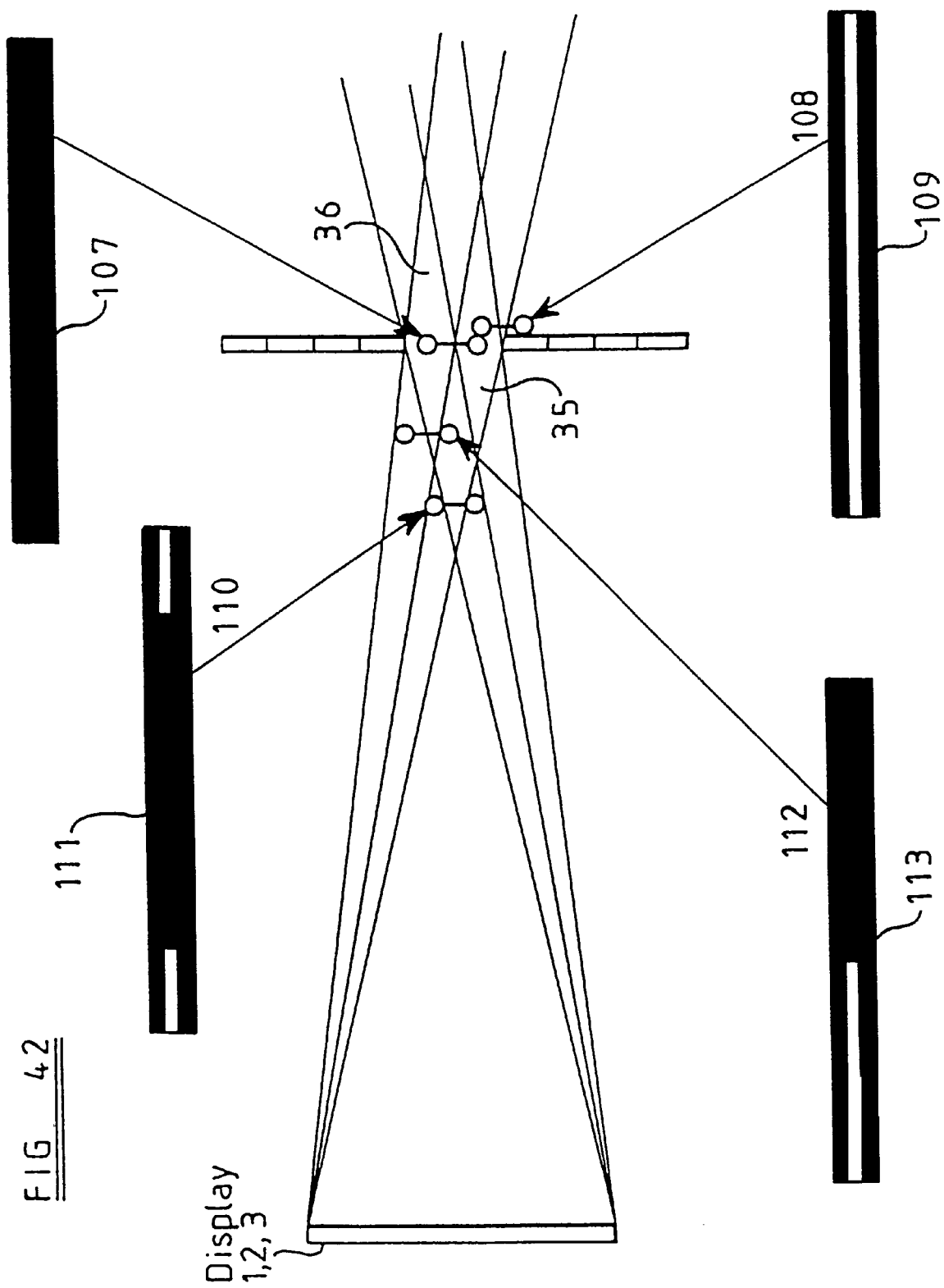
FIG. 42 illustrates possible appearances of a viewer position indicating arrangement for different positions of an observer.

FIG. 42 illustrates typical appearances of viewer position indication for different positions of an observer. The viewer position indication arrangement is assumed to be of the type which provides a horizontal strip which is dark, as shown at 107, when the observer is in an orthoscopic position at the window plane with left and right eyes in the left and right windows of the left and right viewing zones 35 and 36, respectively. In this case, the indicating arrangement appears dark to both eyes.

When the observer is at a position 108 such that the right eye is in the viewing zone 35 but the left eye is outside the viewing zones, the position indication appears black to the right eye but appears as a bright line to the left eye as shown at 109. When the observer is at a position 110 between the display 1, 2, 3 and the viewing zones 35 and 36', the combination of the indication as seen by both eyes appears as shown at 111. Similarly, when the observer is at a position 112, the indication appears as shown at 113. Thus, as soon as the observer moves outside the range of orthoscopic viewing positions, a bright indication starts to appear in at least one eye of the observer.

Figure 43:
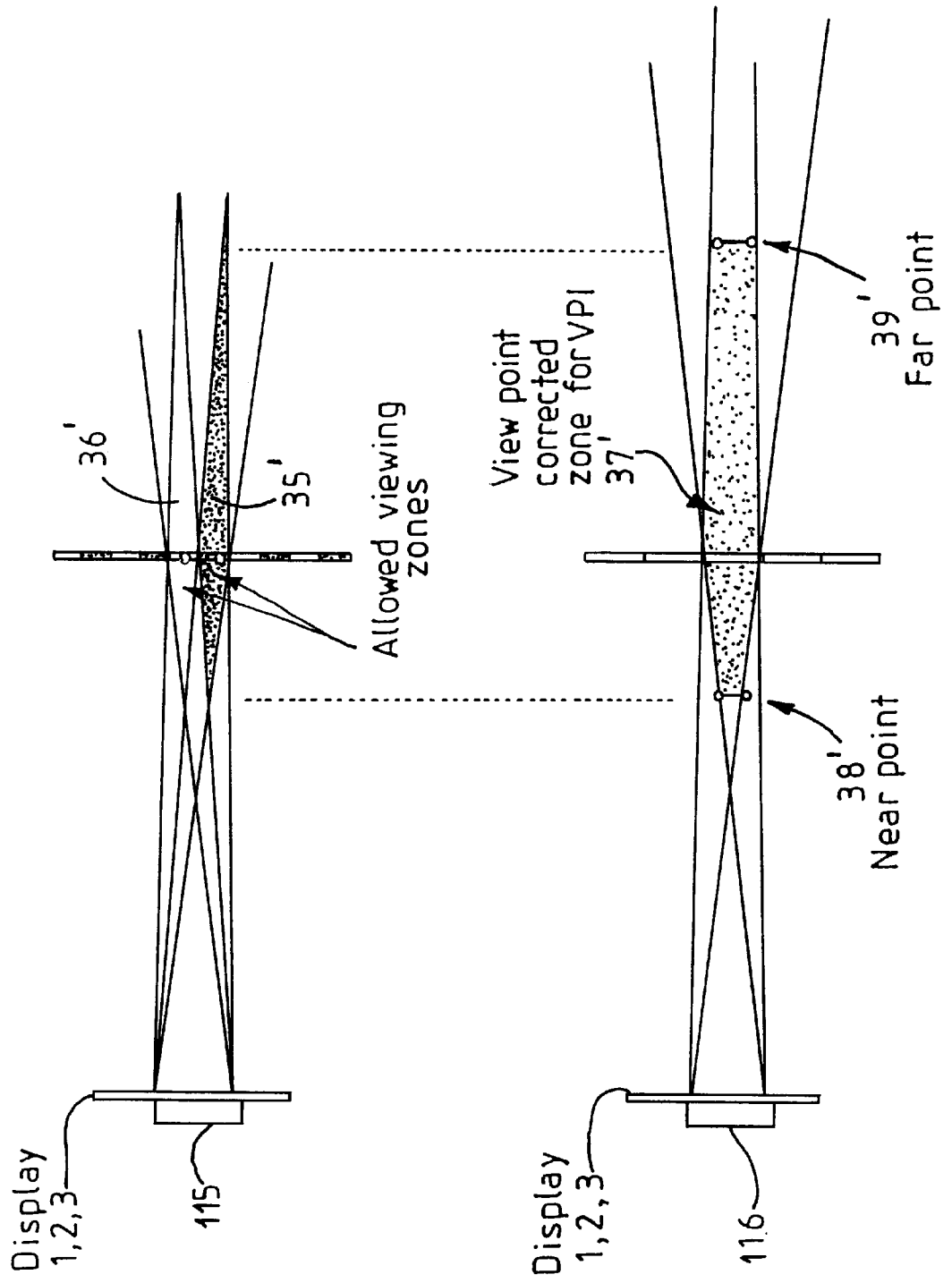
FIG. 43 is a view similar to FIG. 7 but illustrating increased longitudial viewer freedom resulting from reduced lateral extent of a displayed 3D image.

As described hereinbefore, FIG. 7 illustrates the longitudinal viewing freedom when the display 1, 2, 3 displays a full width 3D image. However, the longitudinal extent of the viewing zones is increased when the lateral size of the 3D image is less than the width of the display 1, 2, 3. This is illustrated in FIG. 43, in which the 3-D image is laterally restricted as shown at 115, such that the viewing zones 35' and 36' are substantially longer. In this case, the new near point 38' is nearer the display 1, 2, 3 than the near point 38 shown in FIG. 7. Similarly, the new far point 39' prime is further from the display 1, 2, 3 than the far point 39 shown in FIG. 7.

In order to provide a correct indication to the viewer of the increased longitudinal freedom of movement, the part of the display providing the viewer position indication may be made black in all areas which are laterally outside the lateral extent 115 of the 3D image. Thus, as shown in FIG. 43, only the portion 116 of, for instance, the pixels providing the viewer position indication are used. This results in the view point corrected zone 37' matching the viewing zones 35' and 36' as shown in FIG. 43. Thus, the zone 37' has the same longitudinal viewing freedom as the displayed image.

Figure 44:
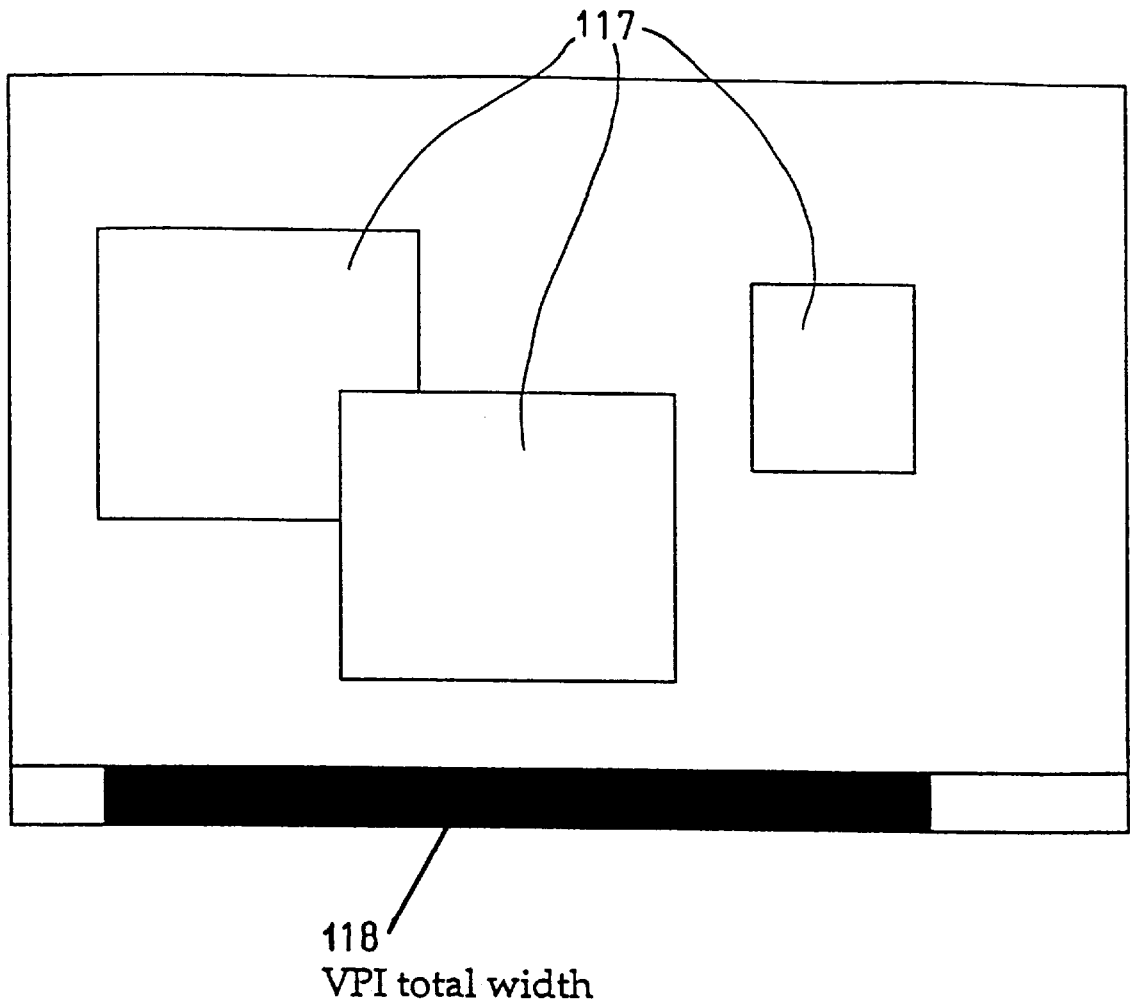
FIG. 44 illustrates the appearance of a display when operating as illustrated in FIG. 43.

The lateral extent 115 of the 3D image or all of the 3D images where more than one is being displayed can be determined by a controller for controlling the image display and can be supplied to viewing position indication width calculating routines, so that the lateral portion 116 of the active indication matches the total lateral extent of the displayed 3D image. As illustrated in FIG. 44, the display 1, 2, 3 may have several regions 117 in which 3D images are being displayed. In order to provide the correct indication of viewing freedom, the total width of the active part of the display providing the viewer position indication is as shown at 118. The active part extends continuously from the lateral position of the left hand most boundary of the 3D images to the right hand most boundary. Thus, optimum viewing freedom of the display can be achieved for all images.

What is claimed is:

1. An autostereoscopic display comprising:
   an image display;
   a signal display and
   a parallax optic, wherein the parallax optic has a first portion, which cooperates with the image display to form a plurality of right and left eye viewing zones in a viewing region, and a second portion, which cooperates with the signal display to form a first signal image which is visible in at least one first part of the viewing region and a second signal image which is visible in at least one second part of the viewing region.

2. An autostereoscopic display as claimed in claim 1, wherein each of the first and second parts comprises a respective adjacent pair of viewing zones.

3. An autostereoscopic display as claimed in claim 1, wherein the at least one first part comprises a plurality of first parts and the at least one second part comprises a plurality of second parts which alternate spatially with the first parts.

4. An autostereoscopic display as claimed in claim 2, wherein at least one first part comprises a plurality of first parts and the at least one second part comprises a plurality of second parts which alternate spatially with the first parts, and
wherein the first parts comprise alternate orthoscopic viewing zones.

5. An autostereoscopic display as claimed in claim 1, wherein one of the first and second signal images is a bright image and the other of the first and second images is a dark image.

6. An autostereoscopic display as claimed in claim 1, wherein the first signal image is of a first colour and the second signal image is of a second colour different from the first colour.

7. An autostereoscopic display as claimed in claim 1, wherein the image display and the signal display comprise first and second portions, respectively, of a common display.

8. An autostereoscopic display as claimed in claim 7, wherein the common display comprises a light-transmissive spatial light modulator and a light source.

9. An autostereoscopic display as claimed in claim 8, wherein the spatial light modulator comprises a liquid crystal device.

10. An autostereoscopic display as claimed in claim 1, wherein the image display and the first portion cooperate to form the viewing zones in a plurality of lobes with two viewing zones per lobe.

11. An autostereoscopic display as claimed in claim 10, wherein the first portion comprises an array of parallax elements having a first pitch in a first direction, and the second portion comprises an array of parallax elements having a second pitch substantially equal to twice the first pitch in the first direction.

12. An autostereoscopic display as claimed in claim 11, wherein the image display comprises an array of picture elements having a third pitch in the first direction substantially equal to or greater than half the first pitch and less than the first pitch and the signal display comprises an array of picture elements which have a fourth pitch substantially equal to twice the third pitch in the first direction and which are substantially coplanar with the picture elements of the image display.

13. An autostereoscopic display as claimed in claim 11, wherein the image display comprises an array of picture elements having a third pitch in the first direction less than half the first pitch, and
wherein the signal display comprises an array of picture elements which have a fourth pitch substantially equal to twice the third pitch in the first direction and which are coplanar with the picture elements of the image display.

14. An autostereoscopic display as claimed in claim 1, wherein the parallax optic comprises a lens array.

15. An autostereoscopic display as claimed in claim 14, wherein the lens array comprises a lenticular screen.

16. An autostereoscopic display as claimed in claim 1, wherein the parallax optic comprises an array of holographic optical elements.

17. An autostereoscopic display as claimed in claim 1, wherein the parallax optic comprises a parallax barrier.

18. An autostereoscopic display as claimed in claim 17, wherein the first portion of the parallax barrier comprises a plurality of slits of a first width and the second portion of the parallax barrier comprises a plurality of slits of the first width.

19. A display as claimed in claim 17, wherein the first portion of the parallax barrier comprises a plurality of slits of a first width and the second portion of the parallax barrier comprises a plurality of slits of a second width less than the first width.

20. A display as claimed in claim 11, wherein the parallax optic comprises a parallax barrier, and
wherein each parallax element of the second portion is aligned in a second direction substantially perpendicular to the first direction with a respective parallax element of the first portion.

21. A display as claimed in claim 1, wherein the parallax optic is removable for a non-autostereoscopic display mode.

22. A display as claimed in claim 17, wherein the parallax barrier comprises a first layer and a removable second layer, the first layer comprising barrier regions for supplying light having a first polarisation and aperture regions for supplying at least light having a second polarisation which is substantially orthogonal to the first polarisation, the second layer comprising a polariser for passing light of the second polarisation.

23. A display as claimed in claim 22, wherein the image display and the signal display are arranged to supply light of the first polarisation, the barrier regions are arranged to pass light of the first polarisation, and the aperture regions are arranged to convert light of the first polarisation at least partially to light of the second polarisation.

24. A display as claimed in claim 23, wherein the first layer is a half waveplate, the barrier regions have optic axes parallel to the first polarisation and the aperture regions have optic axes aligned at about 45° to the first polarisation.

25. A display as claimed in claim 1, wherein the signal display is arranged to be active throughout a lateral extent corresponding to a lateral extent of at least one three dimensional image displayed by the image display.

26. An autostereoscopic display as claimed in claim 1, wherein the second portion of the parallax optic is located above the first portion of the parallax optic.

27. An autostereoscopic display as claimed in claim 1, wherein the second portion of the parallax optic is located below the first portion of the parallax optic.

28. An autostereoscopic display as claimed in claim 1, wherein the second portion of the parallax optic is located to the left of the first portion of the parallax optic.

29. An autostereoscopic display as claimed in claim 1, wherein the second portion of the parallax optic is located to the right of the first portion of the parallax optic.

* * * * *